United States Patent [19]
Watkins et al.

[11] Patent Number: 5,895,126
[45] Date of Patent: Apr. 20, 1999

[54] APPARATUS AND METHODS USING MANDREL TO ROLL FILM IN CAMERA CHAMBER

[75] Inventors: Joseph A. Watkins, Rochester; Jude A. SanGregory, Spencerport; Duane B. Kirk, Hilton; Mark D. Garlock, Rochester; Paul D. Shallenberger, Rochester; Gerald A. Vergari, Rochester, all of N.Y.

[73] Assignee: Eastman Kodak Company, Rochester, N.Y.

[21] Appl. No.: 08/997,566

[22] Filed: Dec. 23, 1997

Related U.S. Application Data

[63] Continuation-in-part of application No. 08/840,482, Apr. 21, 1997, Pat. No. 5,745,797.

[51] Int. Cl.$^6$ ............................................. G03B 17/02
[52] U.S. Cl. ............................ 396/6; 396/538; 242/532.2
[58] Field of Search .......................... 396/6, 429, 538; 53/116, 118, 119; 242/332.3, 532.2, 532.7

[56] References Cited

U.S. PATENT DOCUMENTS

| | | |
|---|---|---|
| 651,118 | 6/1900 | Pascal et al. . |
| 1,921,559 | 8/1933 | Case . |
| 1,921,560 | 8/1933 | Case . |
| 2,484,248 | 10/1949 | Roehrl . |
| 3,057,573 | 10/1962 | Kindig et al. . |
| 3,288,389 | 11/1966 | Gersch et al. . |
| 3,383,064 | 5/1968 | Daly et al. . |
| 3,567,147 | 3/1971 | Engelsmann et al. . |
| 3,643,889 | 2/1972 | Krause . |
| 3,748,715 | 7/1973 | Hoover et al. . |
| 3,850,381 | 11/1974 | Moore . |
| 3,925,798 | 12/1975 | Sanada et al. . |
| 3,930,296 | 1/1976 | Hoover . |
| 3,999,197 | 12/1976 | Iwashita et al. . |
| 4,102,512 | 7/1978 | Lewallyn . |
| 4,171,892 | 10/1979 | Kozuki et al. . |
| 4,205,436 | 6/1980 | Klotz et al. . |
| 4,228,579 | 10/1980 | Dunkel et al. . |
| 4,251,148 | 2/1981 | Stemme et al. . |

(List continued on next page.)

FOREIGN PATENT DOCUMENTS

| | | |
|---|---|---|
| 0743 546 A1 | 11/1996 | European Pat. Off. . |
| 0 750 216 A1 | 12/1996 | European Pat. Off. . |
| 38-20424 | 10/1963 | Japan . |
| 63-271325 | 11/1988 | Japan . |
| 2-52341 | 2/1990 | Japan . |
| 3-2741 | 1/1991 | Japan . |
| 3-2751 | 1/1991 | Japan . |
| 3-2752 | 1/1991 | Japan . |
| 4-251250 | 9/1992 | Japan . |
| 5-134361 | 5/1993 | Japan . |

(List continued on next page.)

OTHER PUBLICATIONS

U.S. Patent Application Serial No. 08/569,634 filed Dec. 8, 1995.
U. S. Patent Application Serial No. 08/607,844 filed Feb. 27, 1996.

*Primary Examiner*—Howard B. Blankenship
*Attorney, Agent, or Firm*—Robert Luke Walker

[57] ABSTRACT

A method and apparatus for assembling a photographic camera having a cartridge chamber and a film chamber. In the method, a film cartridge is positioned in the cartridge chamber. The film cartridge includes a spool and a filmstrip. A leading portion of the filmstrip is curled about a curling axis internal to the supply chamber. During the curling, deflection of the leading portion in directions radial to the axis beyond a predetermined preliminary radius is limited. A main portion of the filmstrip is wound around the leading portion to form a film roll. The film roll has an outermost turn defining a first film roll radius larger than the preliminary radius. Following the winding, the film roll is allowed to expand to a second film roll radius larger than the first film roll radius. Outward telescoping of the film roll is limited.

20 Claims, 31 Drawing Sheets

U.S. PATENT DOCUMENTS

| | | |
|---|---|---|
| 4,256,269 | 3/1981 | Feighery et al. . |
| 4,274,726 | 6/1981 | Yoneyama et al. . |
| 4,303,325 | 12/1981 | Seely . |
| 4,342,509 | 8/1982 | Wakabayashi et al. . |
| 4,451,011 | 5/1984 | Engelsmann et al. . |
| 4,455,074 | 6/1984 | Wong et al. . |
| 4,687,311 | 8/1987 | Desormeaux . |
| 4,699,489 | 10/1987 | Nii . |
| 4,833,495 | 5/1989 | Ohmura et al. . |
| 4,838,497 | 6/1989 | Kramer et al. . |
| 4,884,087 | 11/1989 | Mochida et al. . |
| 4,890,130 | 12/1989 | Takei et al. . |
| 4,954,857 | 9/1990 | Mochida et al. . |
| 4,965,616 | 10/1990 | Horiuchi . |
| 4,972,649 | 11/1990 | Mochida et al. . |
| 5,016,833 | 5/1991 | Hamlin . |
| 5,049,908 | 9/1991 | Murakami . |
| 5,063,400 | 11/1991 | Takei . |
| 5,125,630 | 6/1992 | Hoyt et al. . |
| 5,131,592 | 7/1992 | Shibata et al. . |
| 5,257,748 | 11/1993 | Morizzo . |
| 5,301,892 | 4/1994 | Merz et al. . |
| 5,311,231 | 5/1994 | Suzuki et al. . |
| 5,544,833 | 8/1996 | Zander . |
| 5,608,482 | 3/1997 | Watkins et al. . |
| 5,659,802 | 8/1997 | Watkins et al. . |
| 5,689,733 | 11/1997 | Zawodny et al. . |

FOREIGN PATENT DOCUMENTS

| | | |
|---|---|---|
| 5-323517 | 12/1993 | Japan . |
| 6-130568 | 5/1994 | Japan . |
| 6-289541 | 10/1994 | Japan . |
| 6-295020 | 10/1994 | Japan . |
| 6-295022 | 10/1994 | Japan . |
| 6-332118 | 12/1994 | Japan . |
| 7-13279 | 1/1995 | Japan . |
| 7-5526 | 1/1995 | Japan . |
| 7-209721 | 8/1995 | Japan . |
| 7-219156 | 8/1995 | Japan . |
| 7-219157 | 8/1995 | Japan . |
| 8-171180 | 7/1996 | Japan . |
| 8-171181 | 7/1996 | Japan . |
| 8-262633 | 10/1996 | Japan . |
| 8-262636 | 10/1996 | Japan . |
| 8-262647 | 10/1996 | Japan . |
| 8-314071 | 11/1996 | Japan . |
| 9-43777 | 2/1997 | Japan . |
| 9-43778 | 2/1997 | Japan . |
| 9-43779 | 2/1997 | Japan . |
| 9-211796 | 8/1997 | Japan . |
| 558515 | 1/1944 | United Kingdom . |
| 1060937 | 3/1967 | United Kingdom . |

APPARATUS AND METHODS USING MANDREL TO ROLL FILM IN CAMERA CHAMBER

CROSS REFERENCE TO RELATED APPLICATIONS

This application is a continuation-in-part of U.S. patent application Ser. No. 08/840,482, entitled CAMERA ASSEMBLY METHODS AND APPARATUS, filed Apr. 21, 1997, in the names of Watkins et al., now U.S. Pat. No. 5,745,797.

Reference is made to commonly assigned, co-pending U.S. patent application Ser. No. 08/837632, entitled METHOD AND APPARATUS FOR LOADING A CARTRIDGE IN A CAMERA FRAME ASSEMBLY, filed Apr. 21, 1997, in the names of Marra et al.

Reference is made to commonly assigned, co-pending U.S. patent application Ser. No. 08/997,567 entitled SPOOL REPOSITIONING APPARATUS FOR CAMERA ASSEMBLING AND METHODS, filed concurrently with this application in the names of Joseph Watkins and Jude San Gregory; and hereby incorporated herein by reference.

Reference is made to commonly assigned, co-pending U.S. patent application Ser. No. 08/997,014 entitled CARTRIDGE LOADING APPARATUS AND METHODS, filed concurrently with this application in the names of Thomas Glanville, Sr. and Joseph Watkins; and hereby incorporated herein by reference.

FIELD OF THE INVENTION

The invention relates to photographic equipment and more particularly relates to camera assembly methods and apparatus.

BACKGROUND OF THE INVENTION

Single use cameras are commonly sold preloaded with a cartridge of film. In order reduce complexity and costs, a rewind mechanism is omitted from the camera. Instead, the film is prewound and during use is advanced back into the film canister. A number of approaches have been followed in loading and prewinding film cartridges for single use cameras. In some approaches, such as one taught in U.S. Pat. No. 4,972,649; film is prewound into a roll outside the camera body and then loaded. A shortcoming of these approaches is that the film roll must be handled after it is formed. This presents a risk of film damage and may add complexity to necessary equipment. In some other approaches, also taught in U.S. Pat. No. 4,972,649; the cartridge is loaded, the camera is light-tightly closed, and the film is then prewound. In still other approaches, such as taught by U.S. Pat. No. 5,311,231; the cartridge is loaded and then the rear opening of the camera body is closed and the film is prewound through a bottom opening, which is later sealed. The latter two approaches have the shortcoming that film guiding is provided primarily by the camera body, rather than loading apparatus. This places constraints on the camera body in terms of required tolerances and the like and may, in addition, slow throughput speeds. Still another approach is taught by Japanese Kokai 6-295022, European Patent Application No. 0743546-A, and Japanese Kokai 8-171180. In this approach, the film is wound onto a second spool, rather than being wound into a film roll. The back of the camera is not mandatory for guiding the film, since the second spool tends to restrain the film.

One of the risks presented in loading and prewinding film cartridges into single use camera assemblies has been damage due to pinching of the filmstrip during assembly. In approaches, such as taught by U.S. Pat. No. 5,311,231, pinching can result from outward telescoping of the film roll after prewinding.

It would thus be desirable to provide camera assembly methods and apparatus in which a spoolless film roll is wound, from a cartridge, into an open camera assembly, using apparatus components to guide winding and reduce the risk of filmstrip pinching, including pinching due to outward telescoping of the film roll.

SUMMARY OF THE INVENTION

The invention is defined by the claims. The invention, in its broader aspects, provides a method and apparatus for assembling a photographic camera having a cartridge chamber and a film chamber. In the method, a film cartridge is positioned in the cartridge chamber. The film cartridge includes a spool and a filmstrip. A leading portion of the filmstrip is curled about a curling axis internal to the supply chamber. During the curling, deflection of the leading portion in directions radial to the axis beyond a predetermined preliminary radius is limited. A main portion of the filmstrip is wound around the leading portion to form a film roll. The film roll has an outermost turn defining a first film roll radius larger than the preliminary radius. Following the winding, the film roll is allowed to expand to a second film roll radius larger than the first film roll radius. Outward telescoping of the film roll is limited.

It is an advantageous effect of at least some of the embodiments of the invention that camera assembly methods and apparatus are provided in which a spoolless film roll is wound, from a cartridge, into an open camera assembly, using apparatus components to guide winding and reduce the risk of filmstrip pinching, including pinching due to outward telescoping of the film roll.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

3

Figure 8:
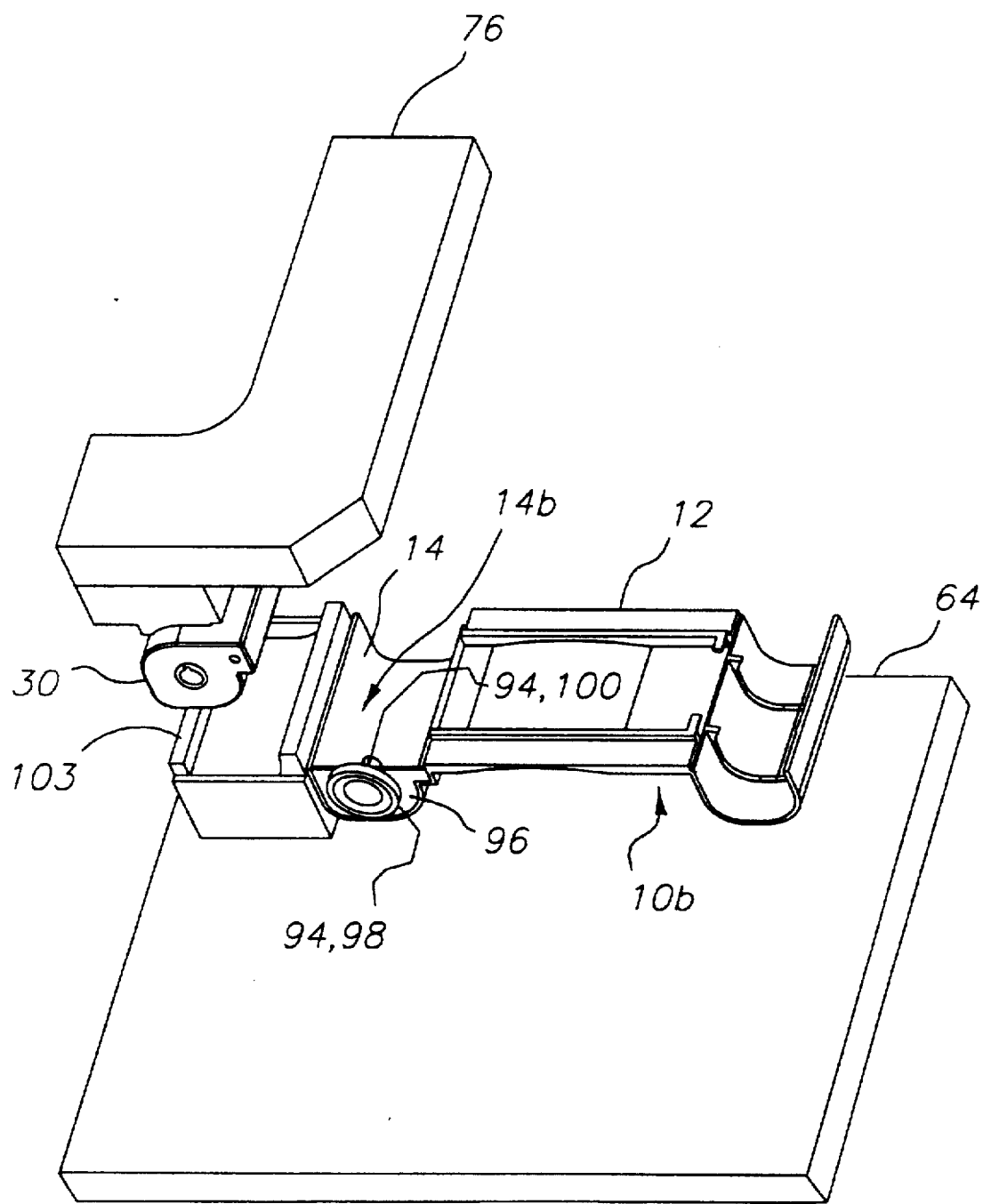

FIG. 8 is a semi-diagrammatical perspective view of a cartridge moving in another embodiment of the apparatus.

Figure 9:
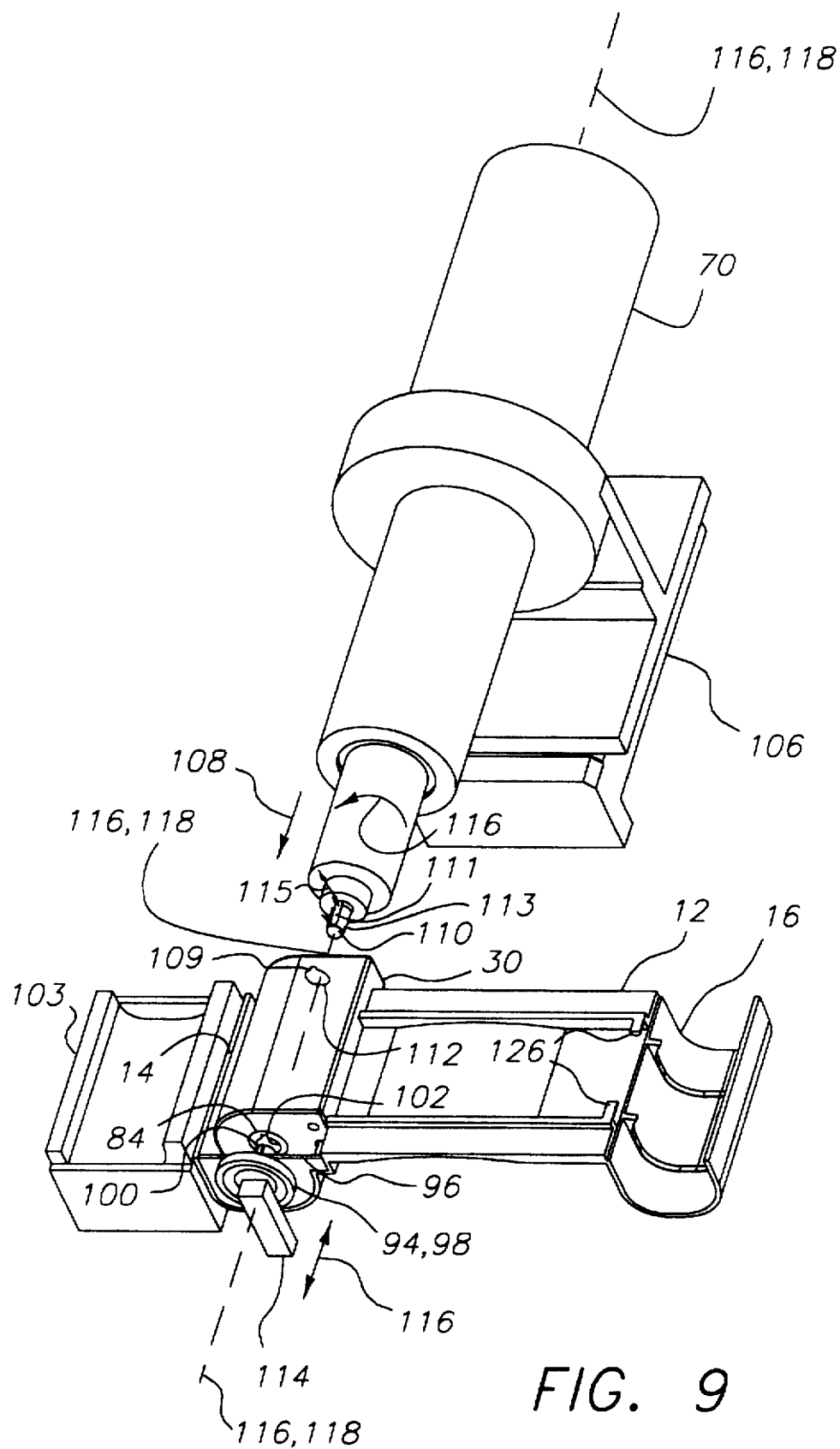

FIG. 9 is the same view as FIG. 8 showing an initial stage of cartridge loading.

Figure 10:
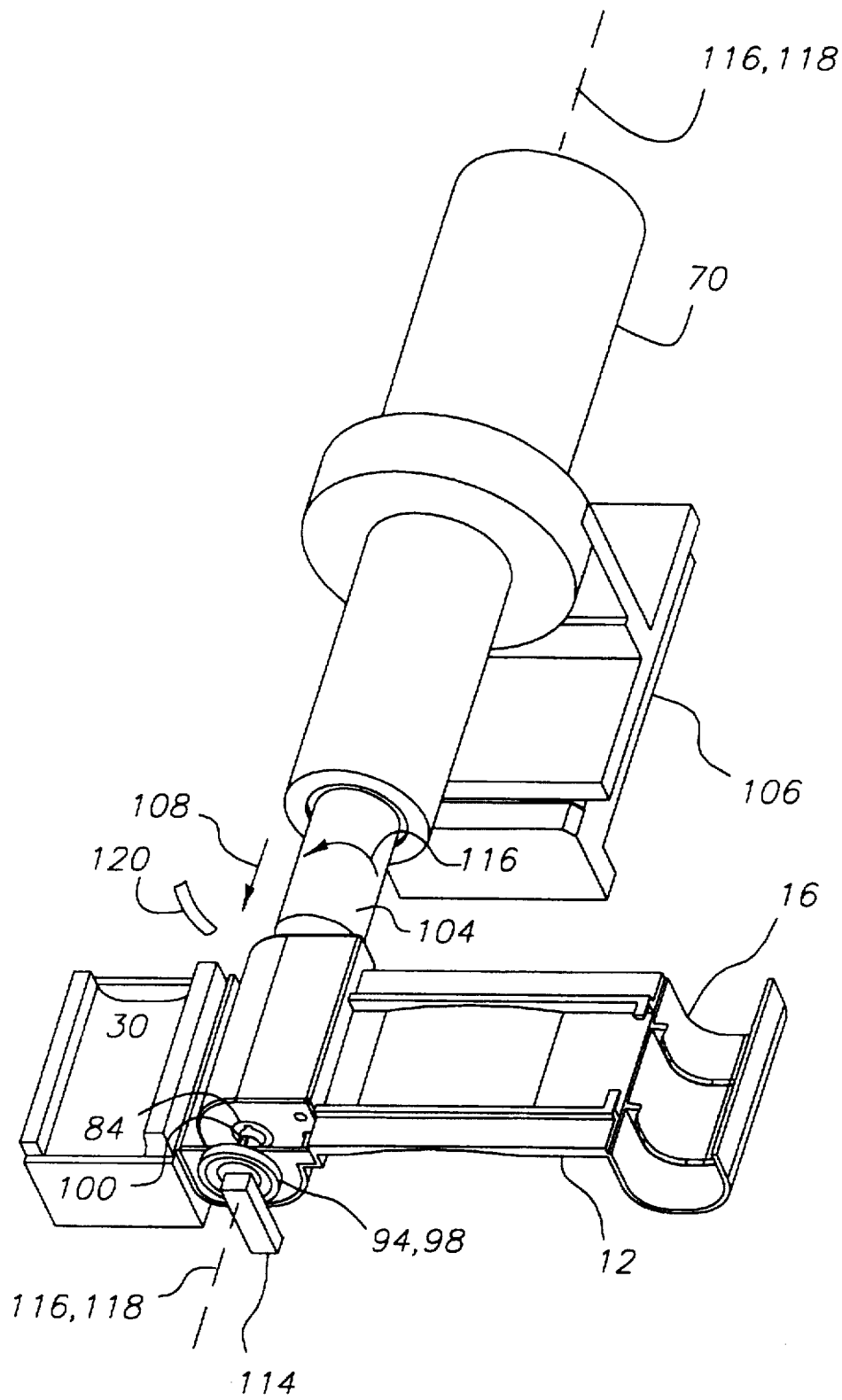

FIG. 10 is the same view as FIG. 8 showing a latter stage of cartridge loading.

Figure 11:
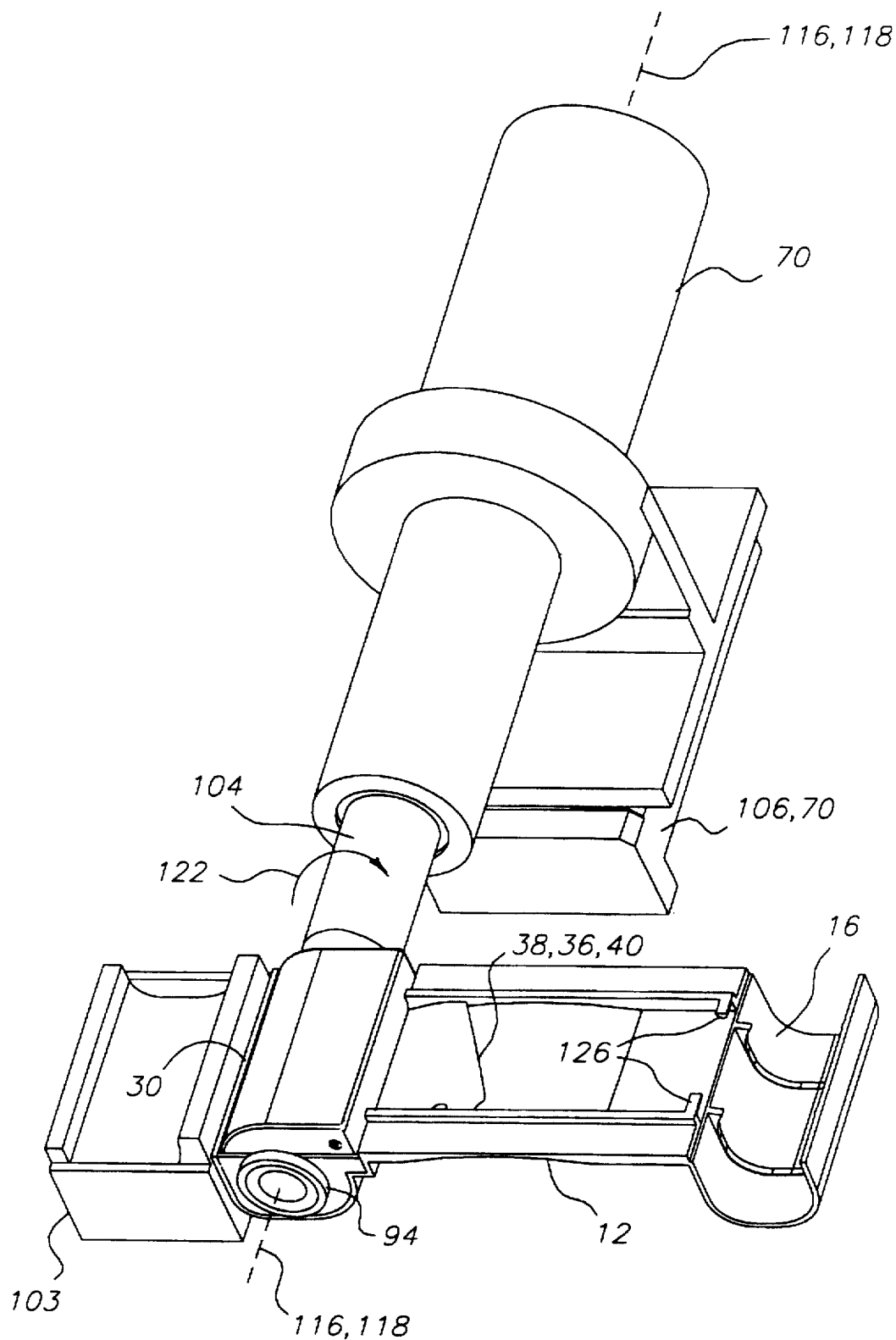

FIG. 11 is the same view as FIG. 8 showing film advancing.

Figure 12:
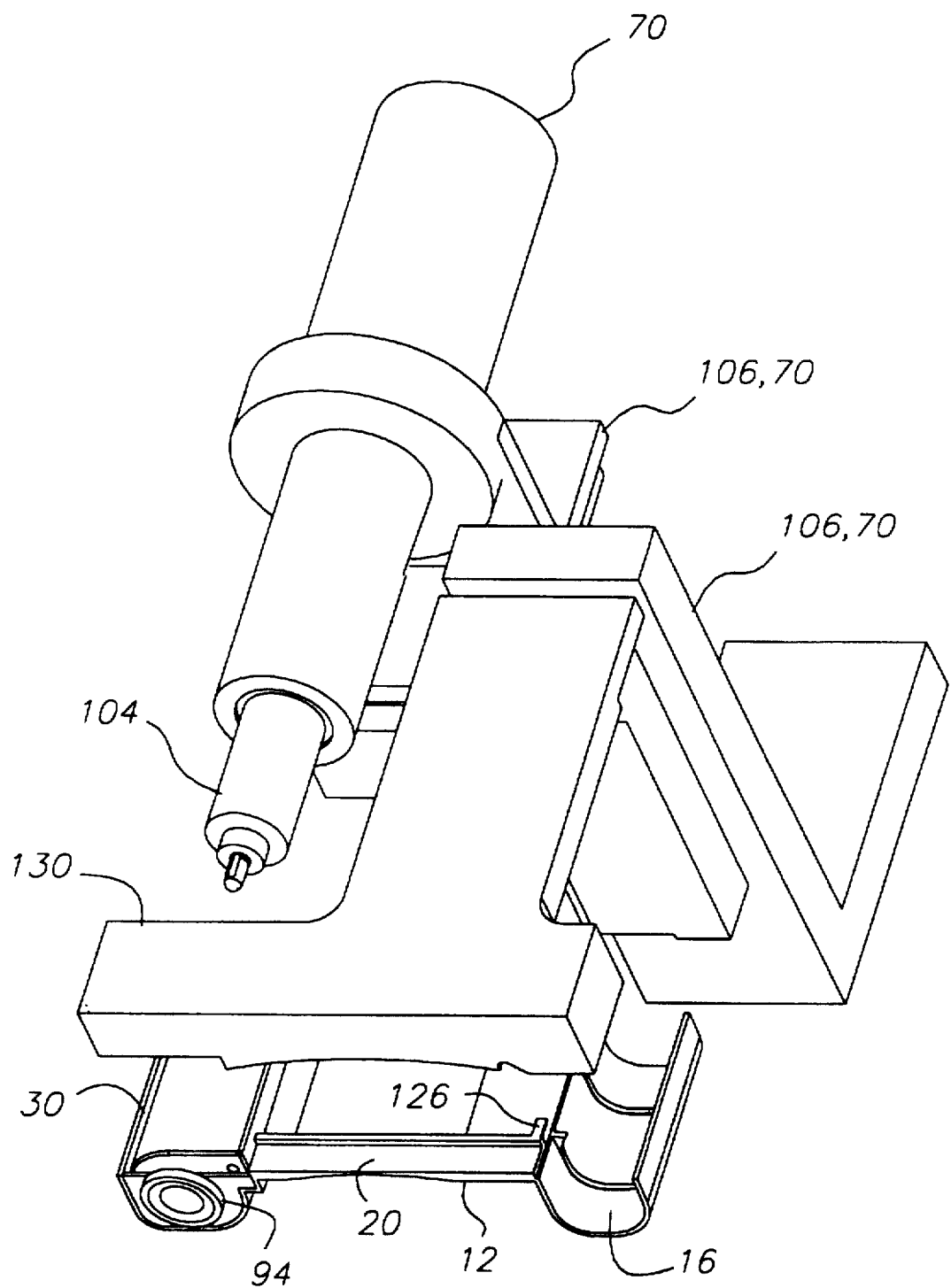

FIG. 12 is the same view as FIG. 8 showing a modified apparatus station including a film guiding member.

Figure 13:
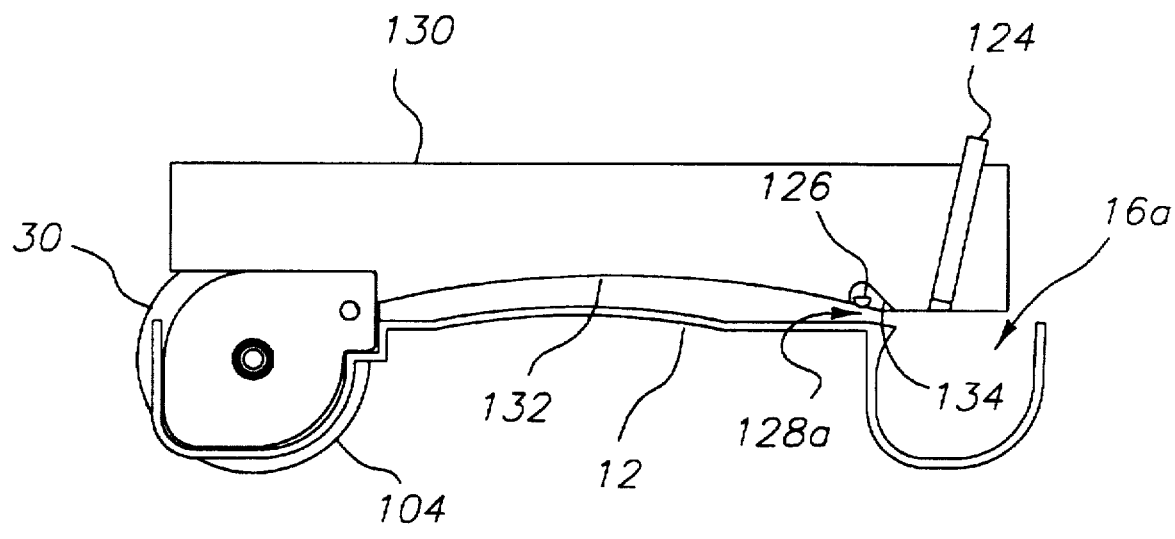

FIG. 13 is a semi-diagrammatical vertical cross-section of film guiding member of FIG. 12 in place on a camera frame assembly.

Figure 14:
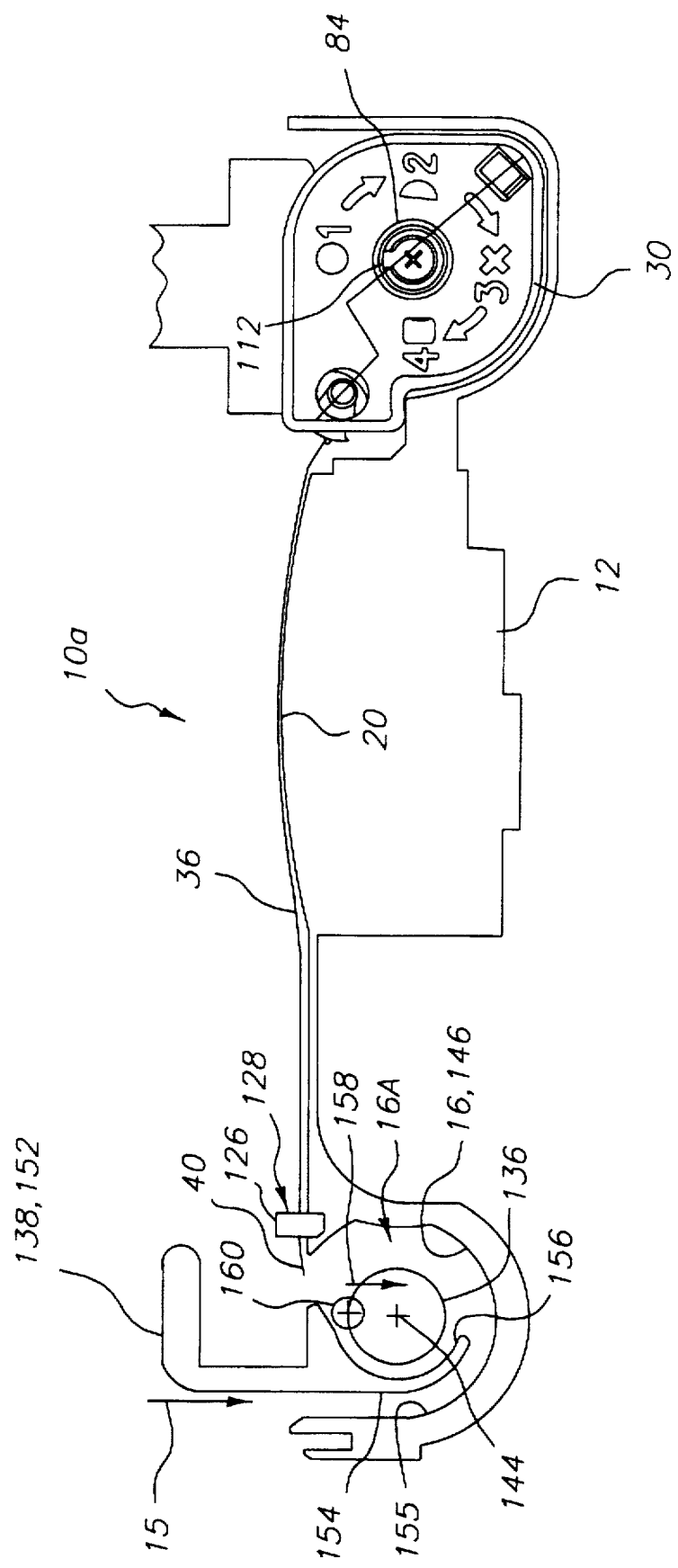

FIG. 14 is a semi-diagrammatical vertical cross-section of a film winding station of another embodiment of the apparatus, including a camera frame assembly.

Figure 15:
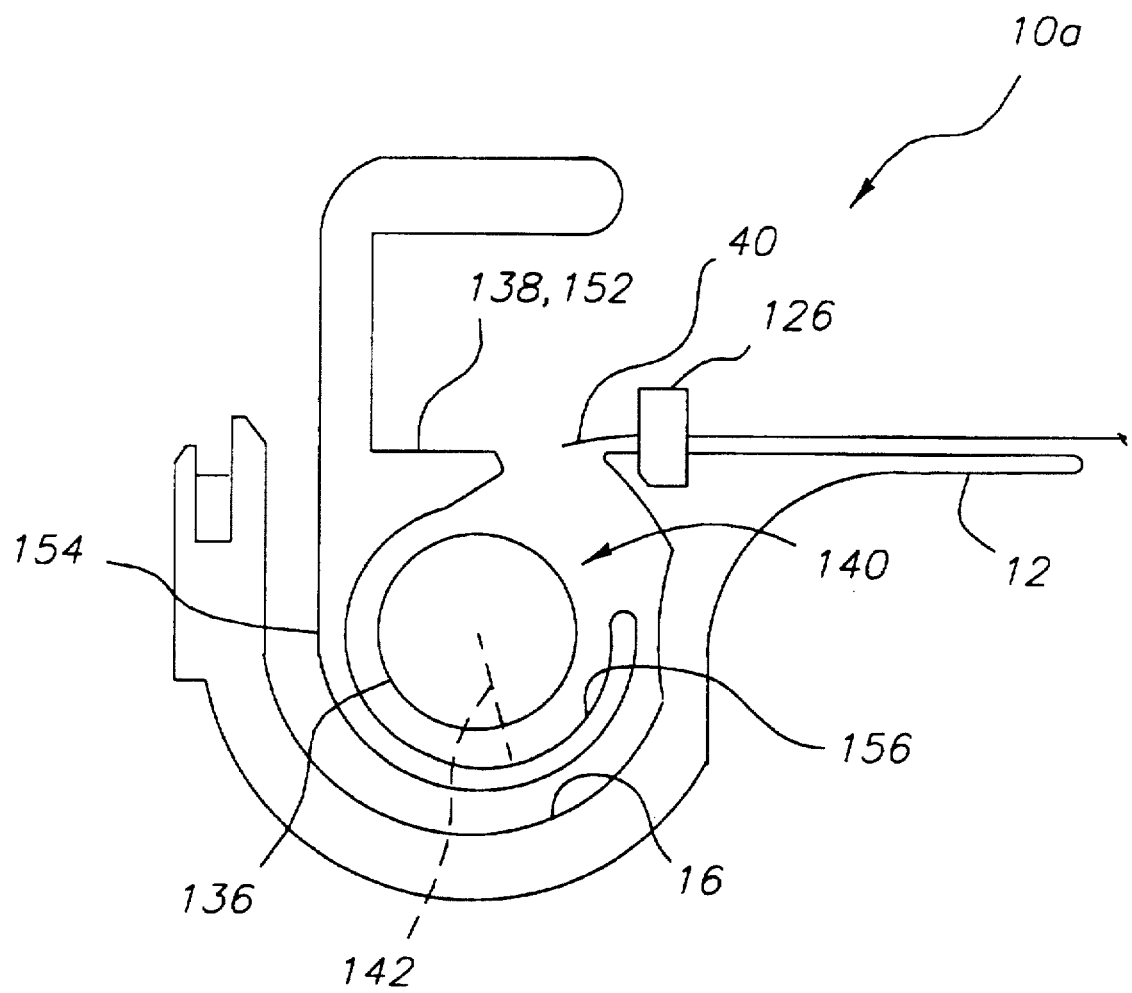
Figure 16:
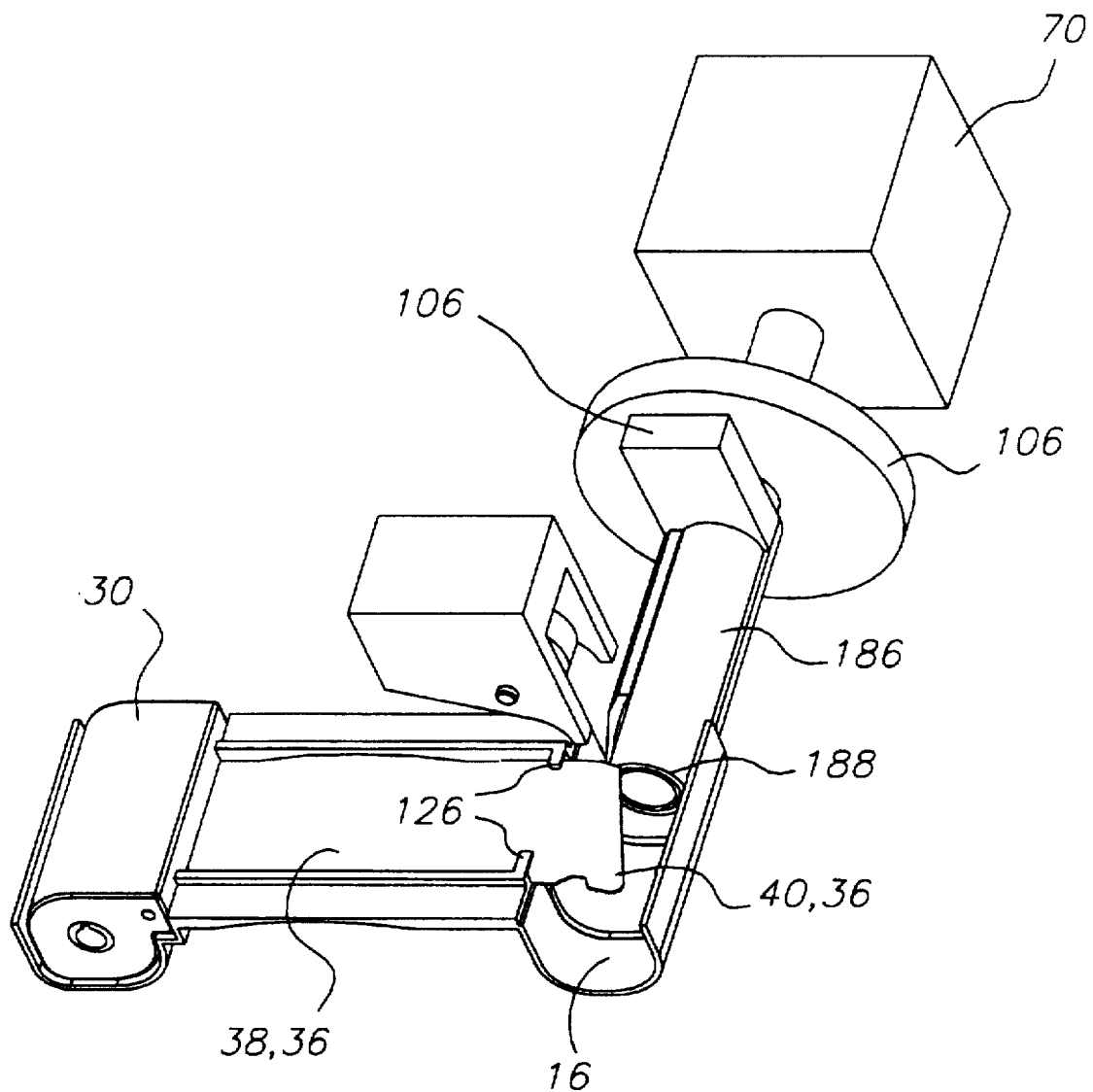
Figure 17:
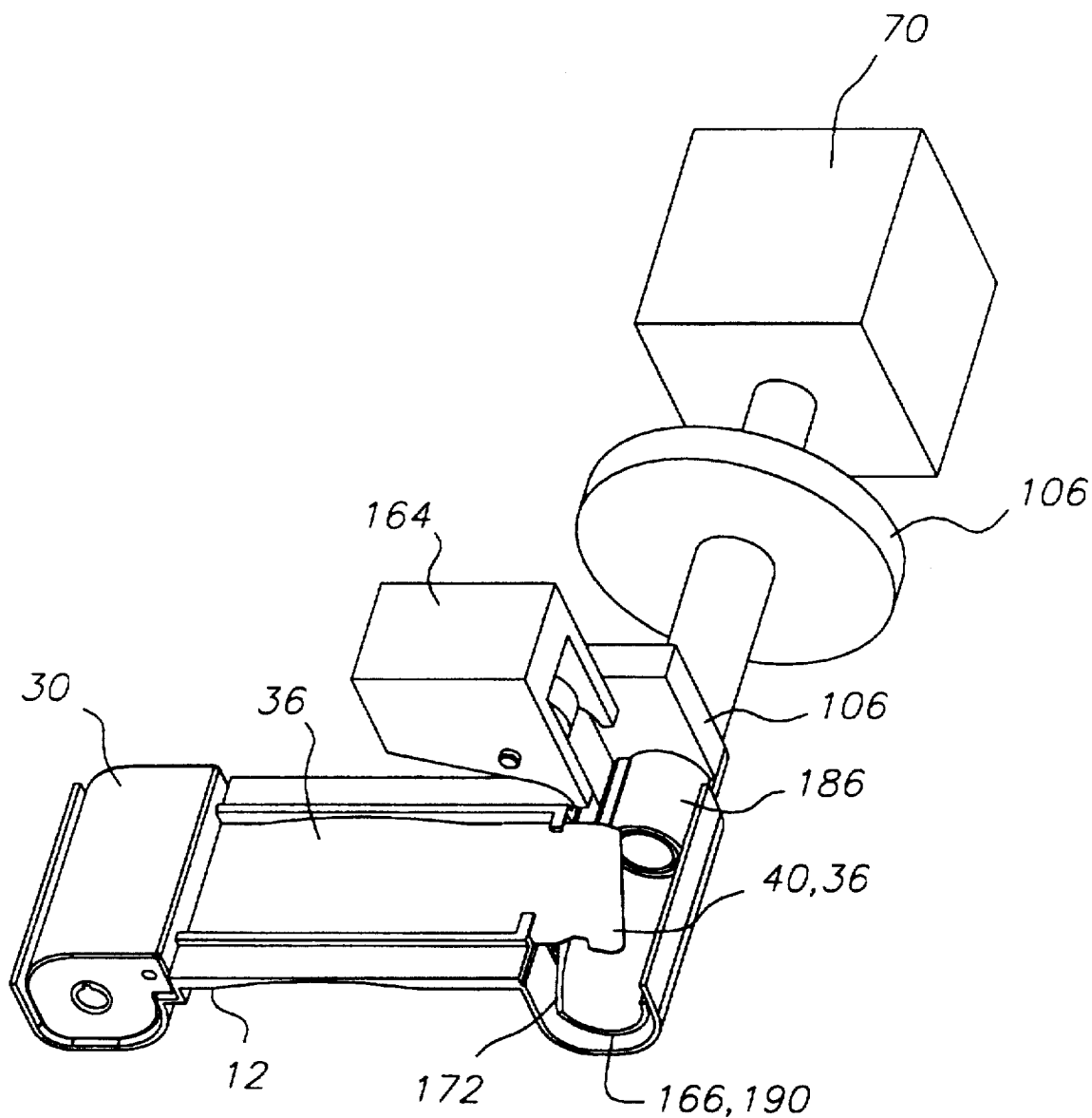
Figure 18:
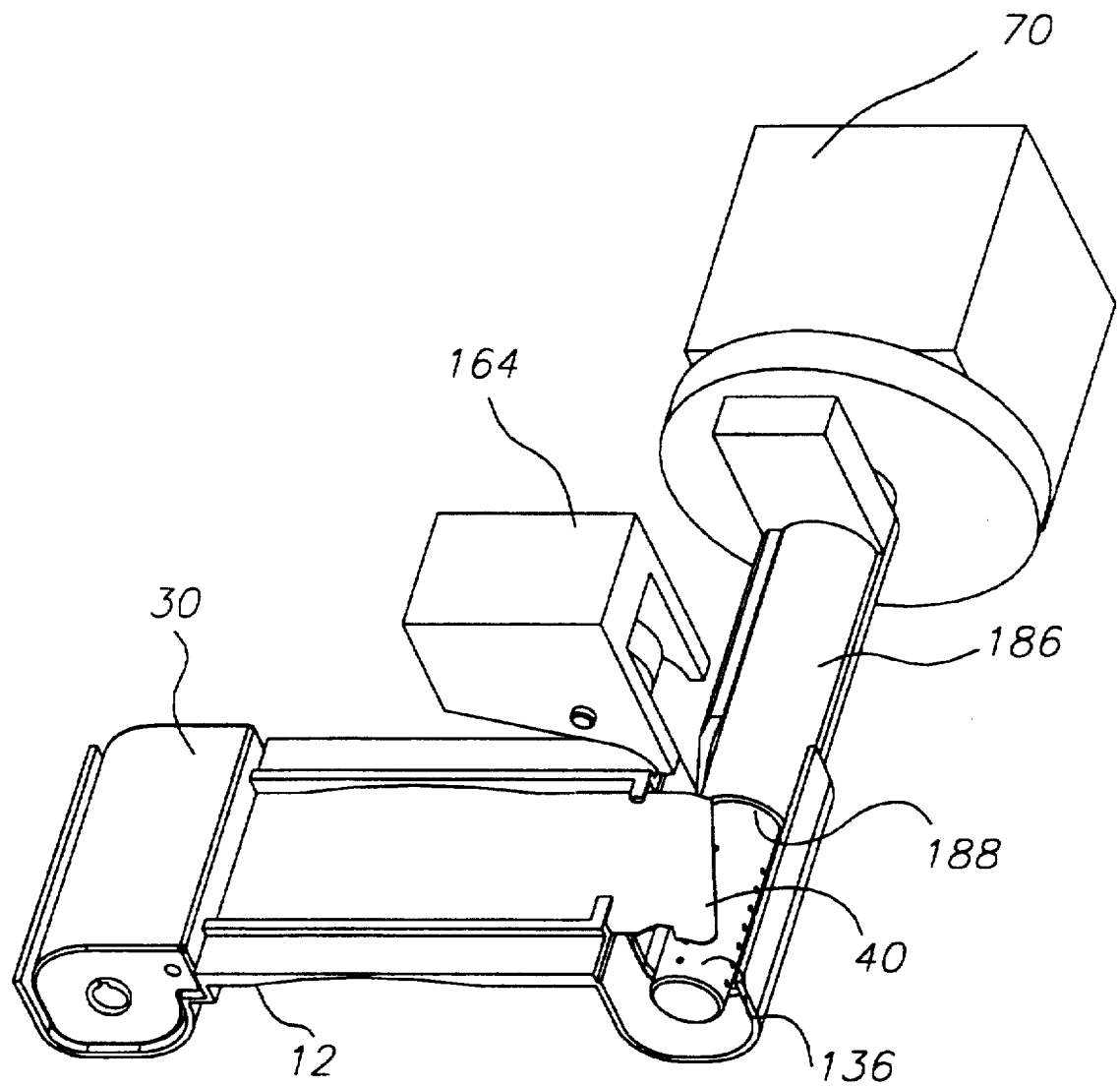
Figure 19:
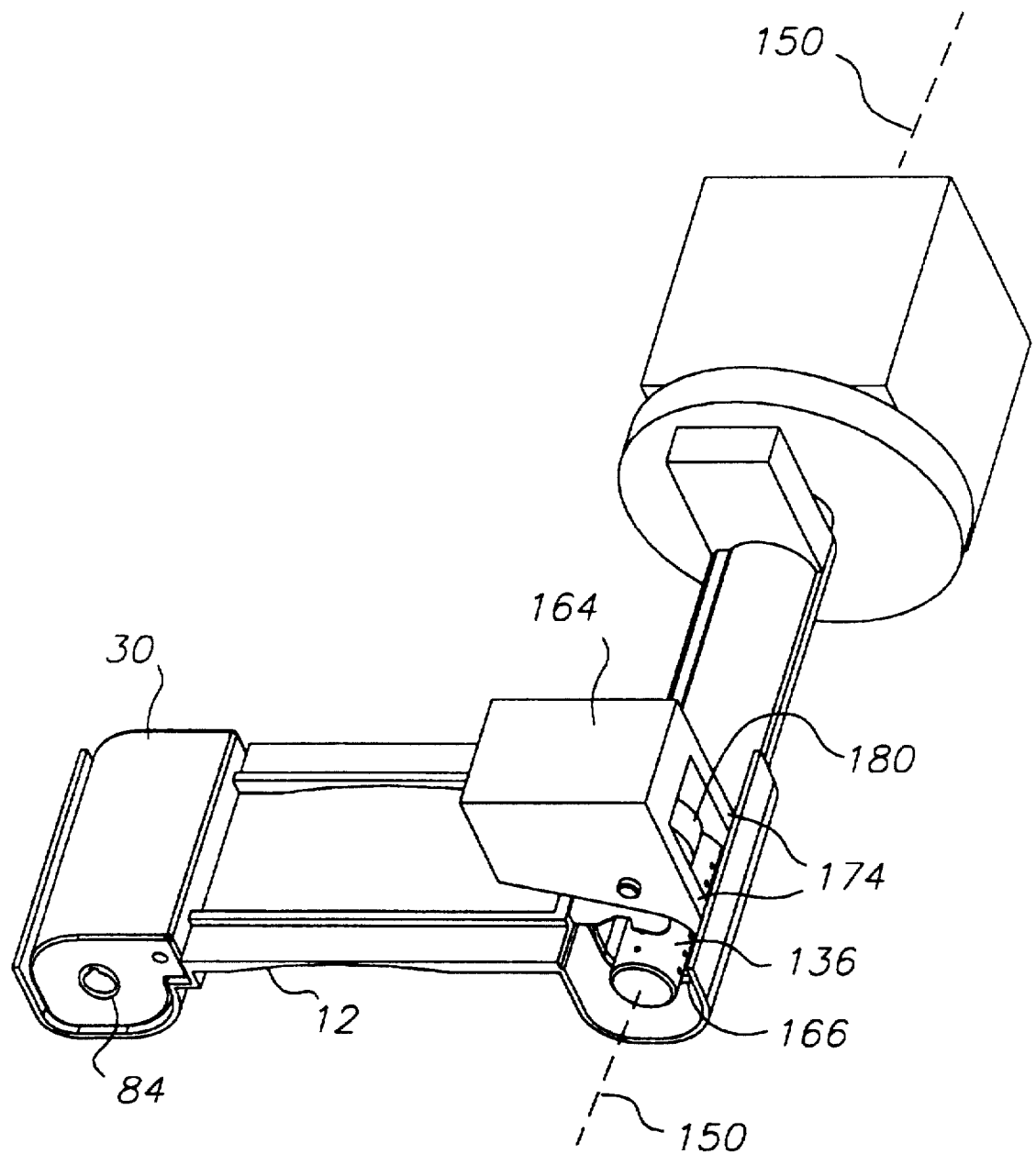

FIG. 15 is a partial enlargement of the same view as FIG. 14 of still another embodiment of the apparatus.

FIGS. 16–19 are semi-diagrammatical perspective views of different stages of film winding in a winding station of the apparatus of FIG. 8.

Figure 20:
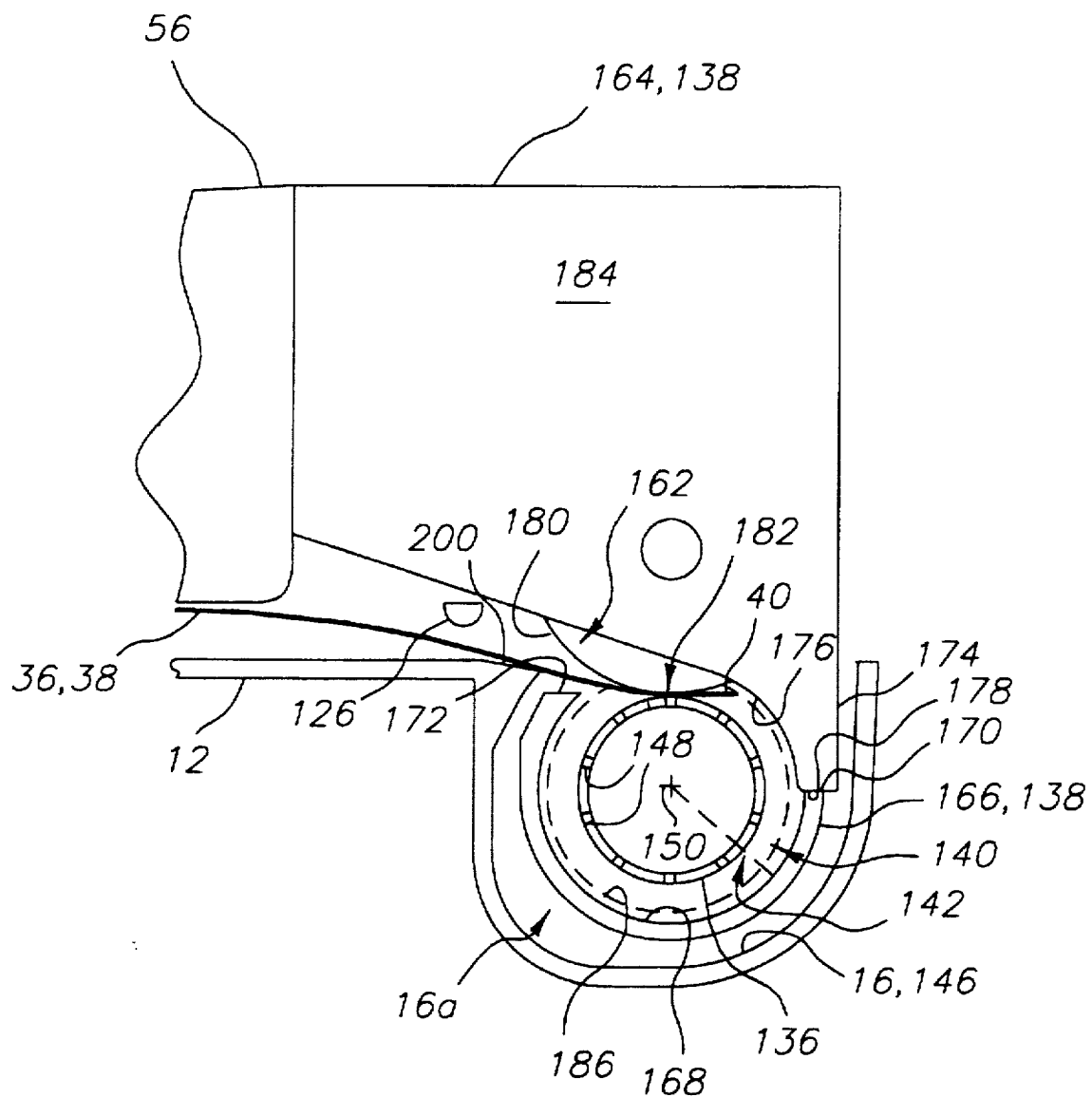

FIG. 20 is a semi-diagrammatical partial cross-sectional view of the winding station of FIGS. 16–19. An optional component is also shown.

Figure 21:
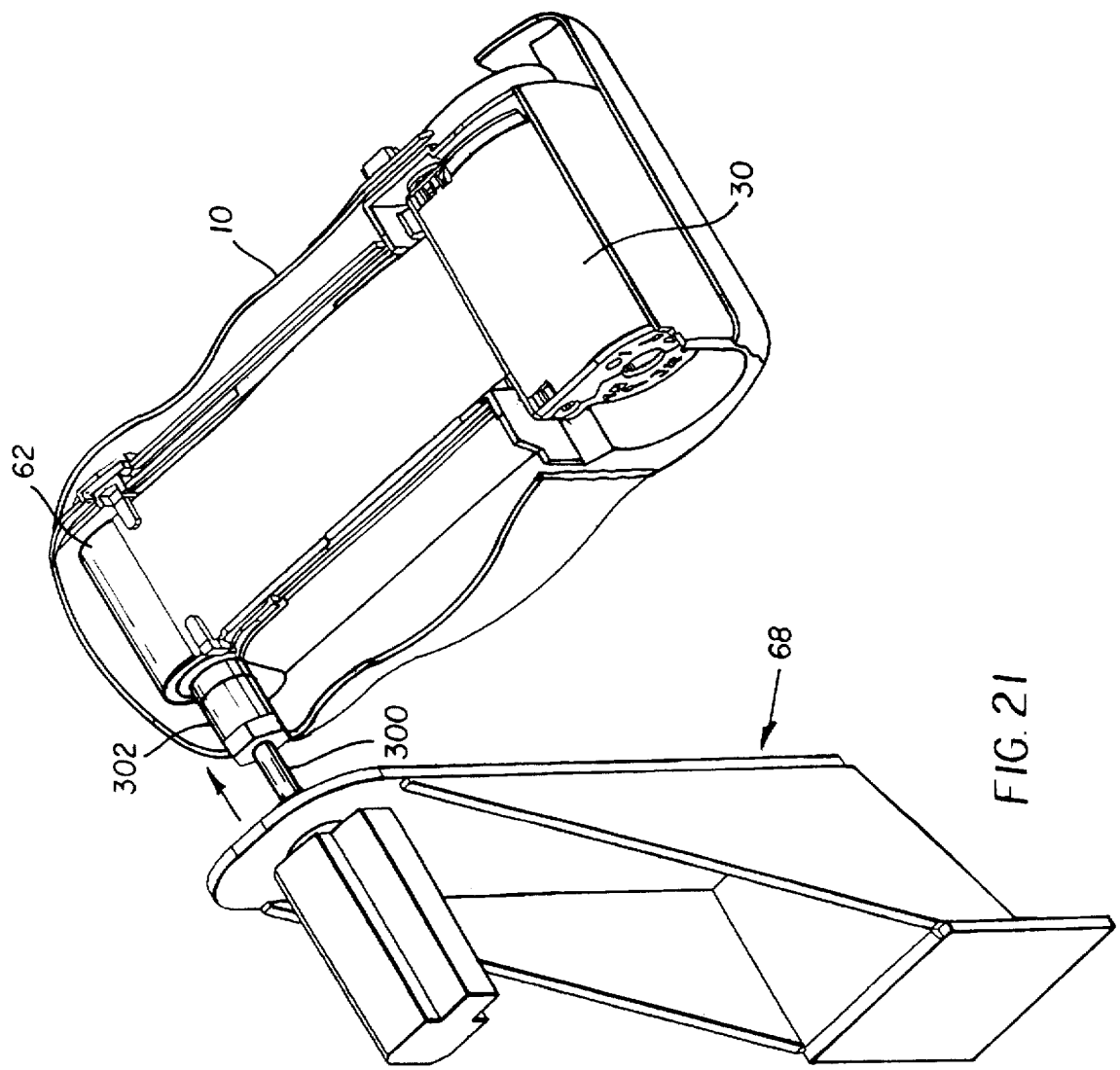

FIG. 21 is a semi-diagrammatical view of a tamper of another embodiment of the apparatus. The direction of axial lodging is indicated by an arrow.

Figure 22:
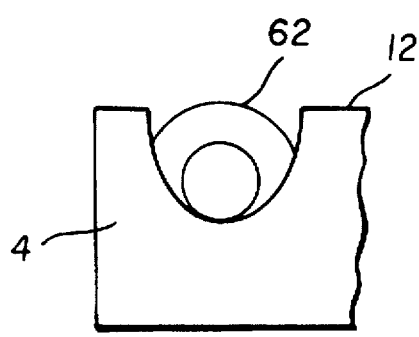

FIG. 22 is a semidiagrammatical partial side view of a camera frame assembly which the includes a prepositioned partial wall and is useful in an embodiment of the method.

Figure 23:
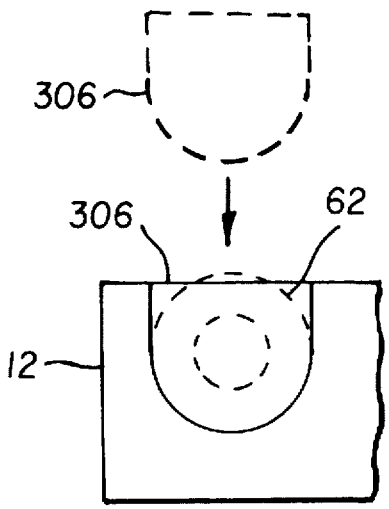

FIG. 23 is a semidiagrammatical partial side view of another camera frame assembly which includes a post-loading wall and is useful in another embodiment of the method. The post-loading wall is installed on the frame in a direction radial to the supply chamber axis (indicated by a cross).

Figure 24:
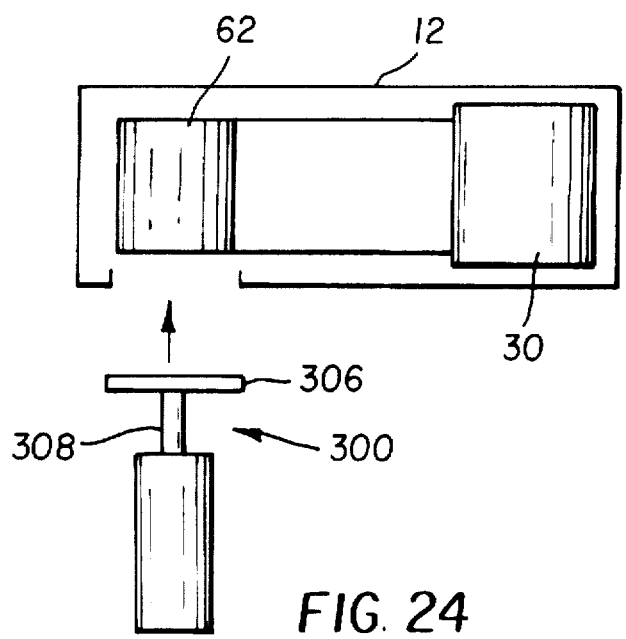

FIG. 24 is a semidiagrammatical top view of another camera frame assembly which includes an opening at one end of the supply chamber and is useful in another embodiment of the method. In this embodiment, a tamper includes a post-loading wall that is fixed to the frame during axial lodging.

Figure 25:
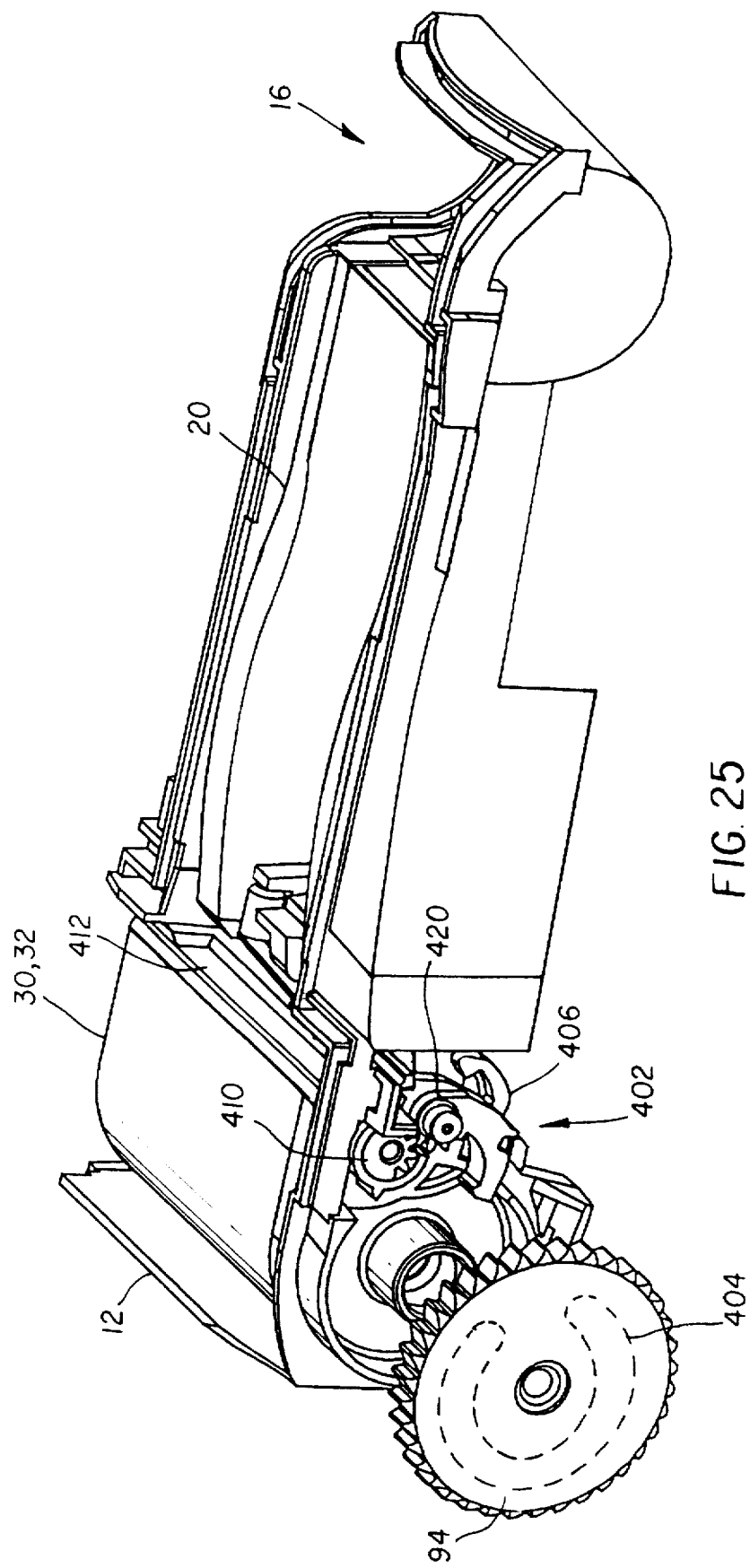

FIG. 25 is a top, rear perspective view of a camera frame assembly useful with particular embodiments of the apparatus and methods. The cartridge is shown in engagement with the thumbwheel; however, for clarity, the view is partially exploded (the thumbwheel is shown displaced from the camera frame assembly) and the sensor lever is not shown.

Figure 26:
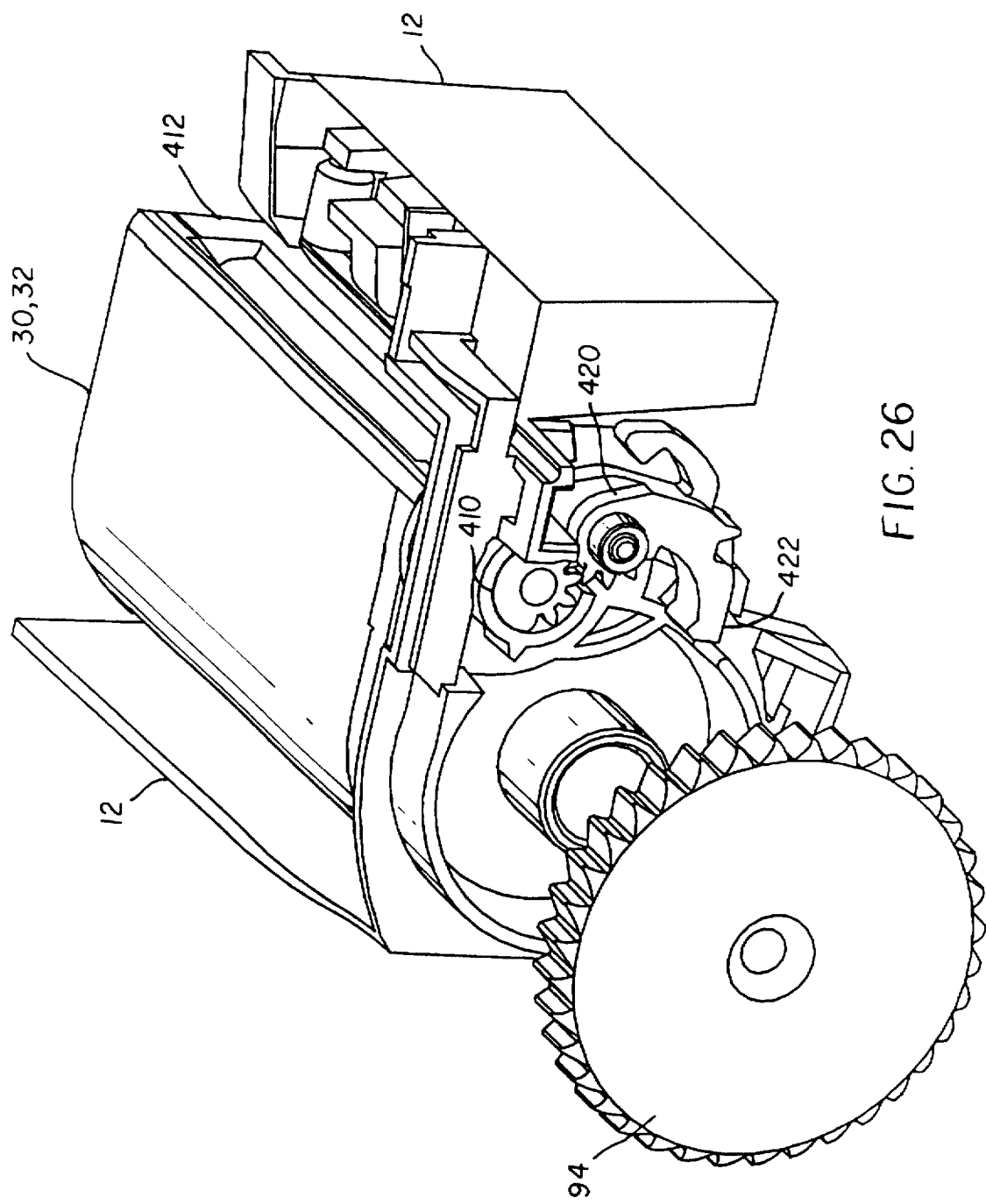

FIG. 26 is a partial enlargement of the view of FIG. 25. The drive unit is in a film sensed position.

Figure 27:
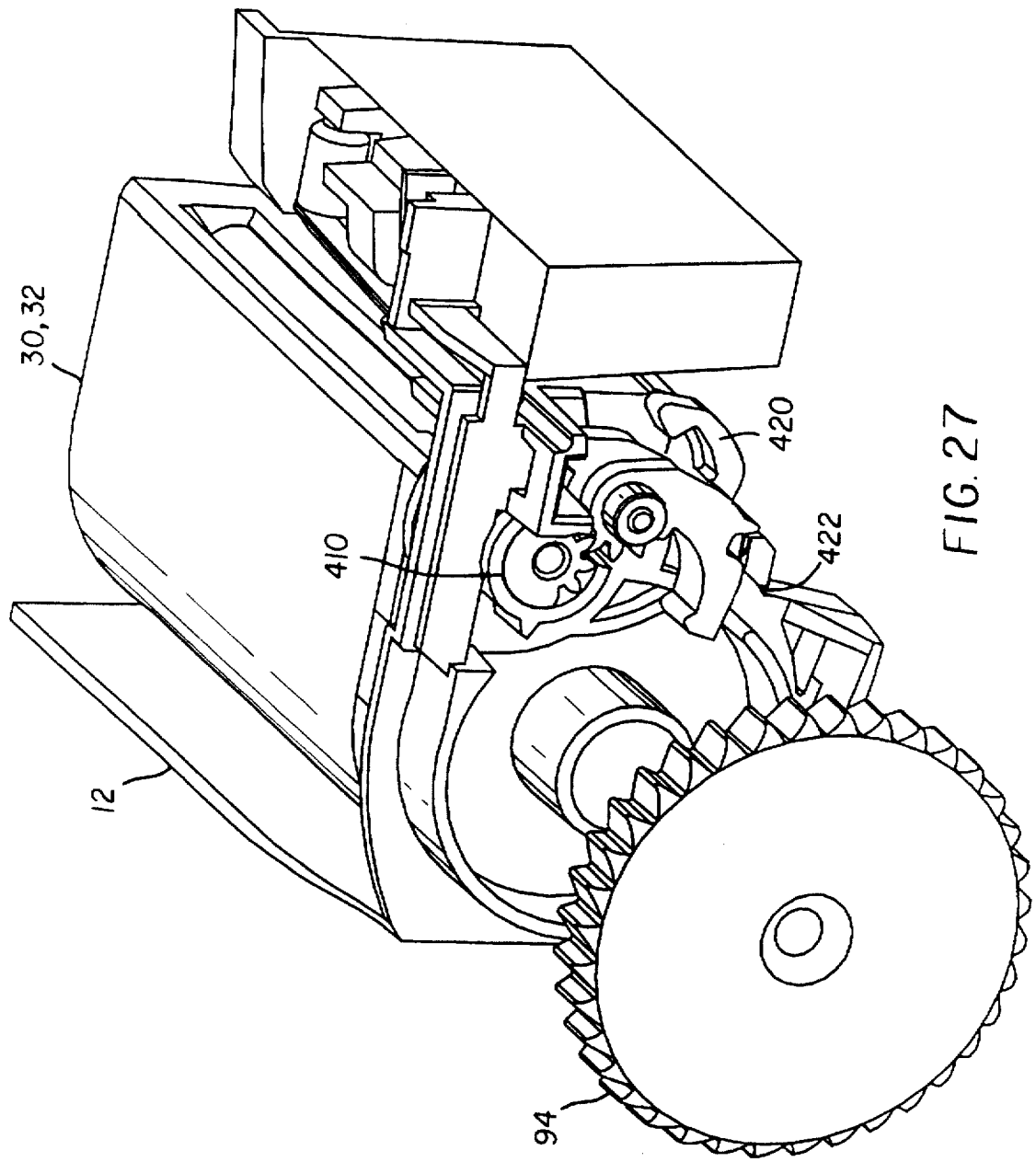

FIG. 27 is the same view as FIG. 26, but the drive unit is in a film absent-light lock open position.

Figure 28:
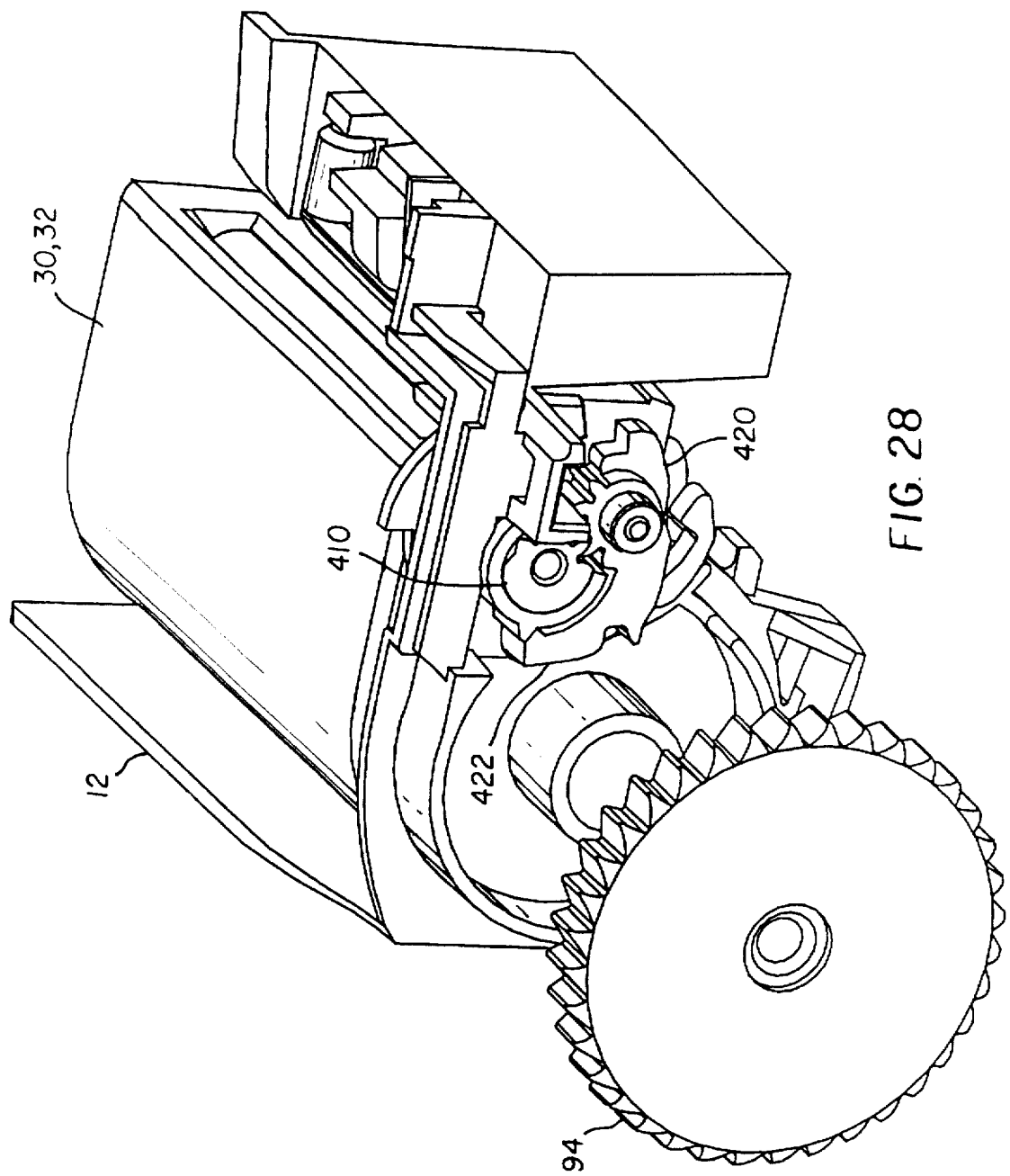

FIG. 28 is the same view as FIG. 26, but the drive unit is in a film absent-light lock closed position.

Figure 29:
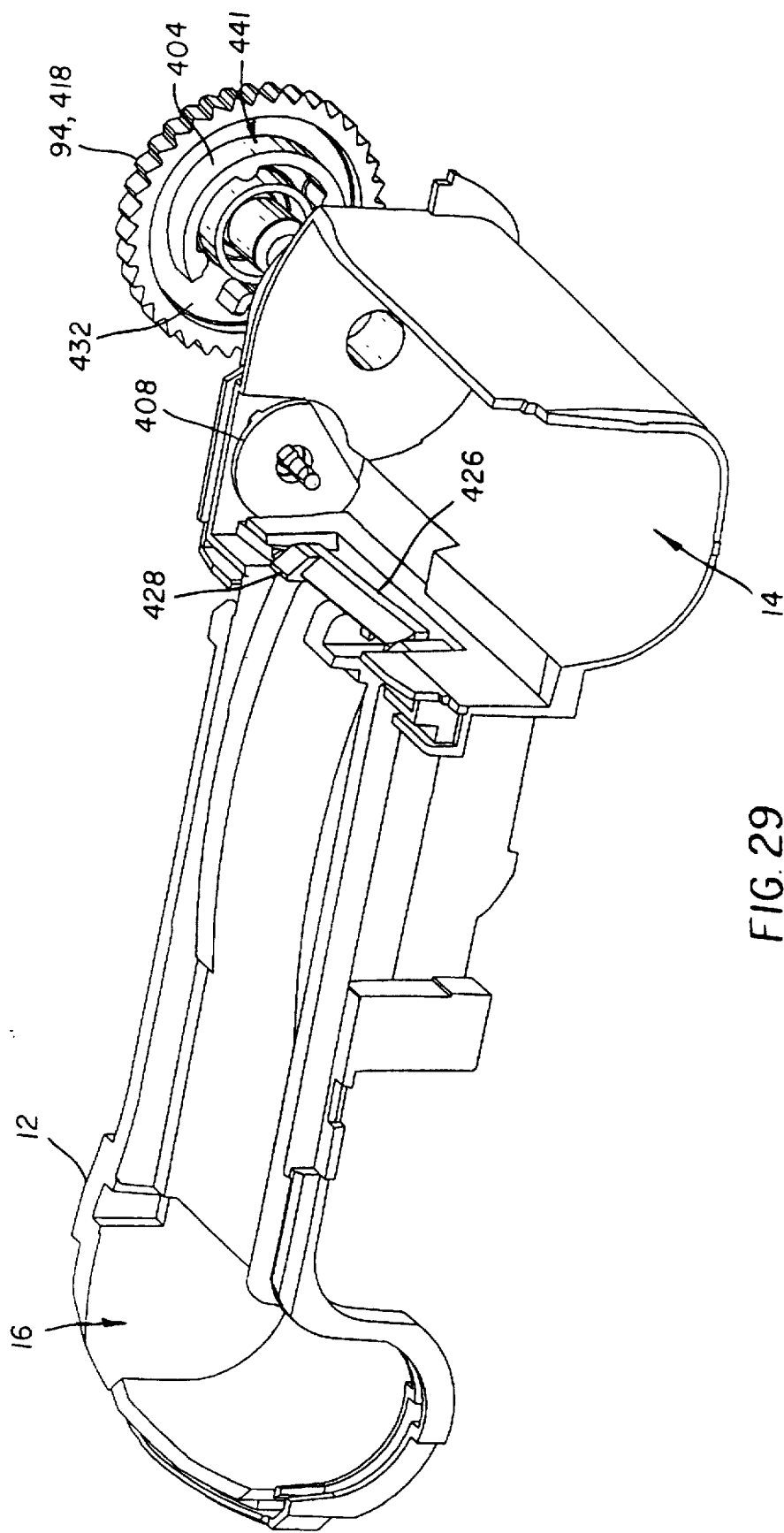

FIG. 29 is a bottom, rear perspective view of the camera frame assembly of FIG. 25. The drive unit and sensor lever are shown in the film sensed position.

Figure 30:
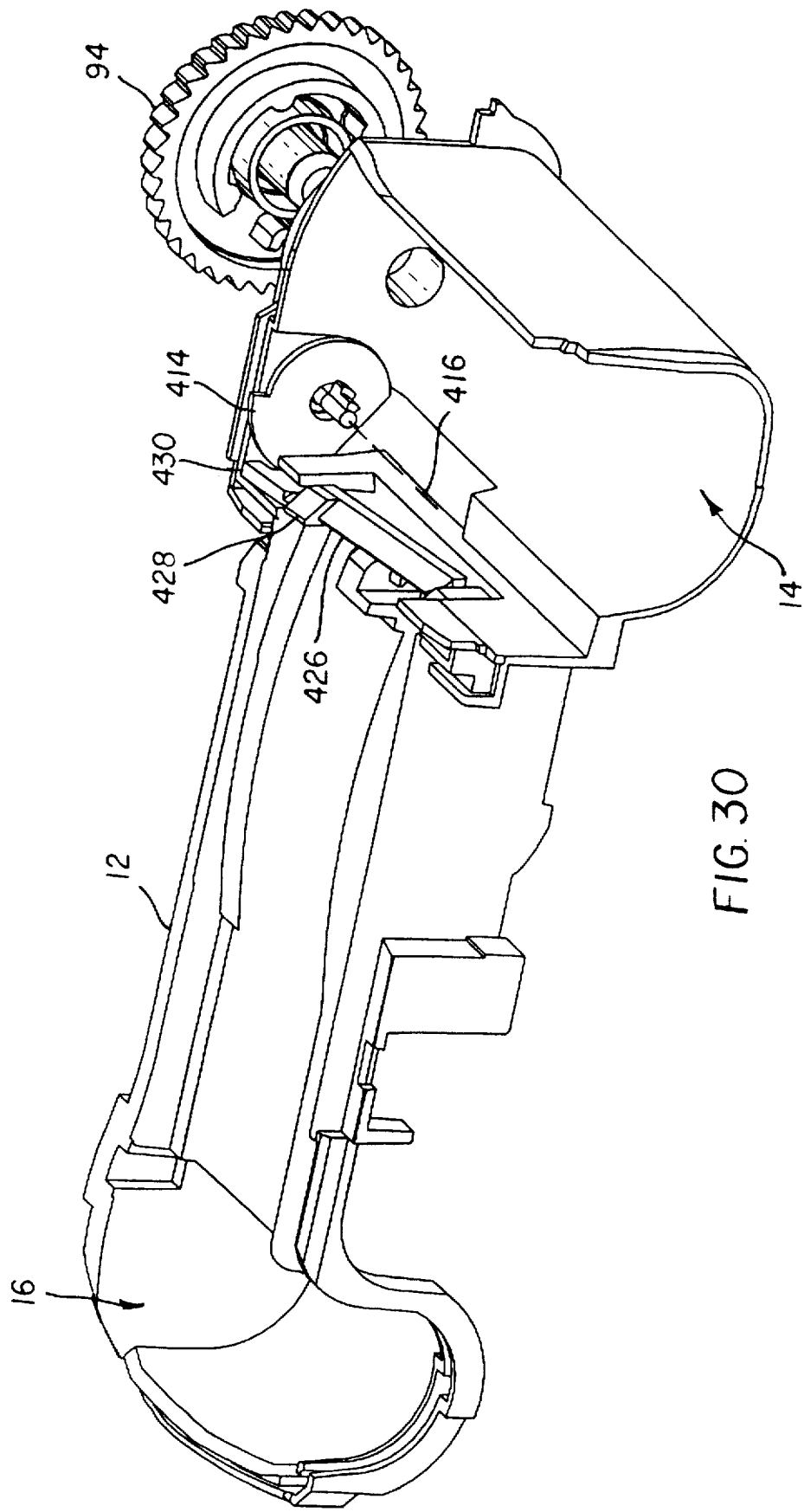

FIG. 30 is the same view as FIG. 29, but the drive unit and sensor lever are shown in the film absent-light lock closed position.

Figure 31:
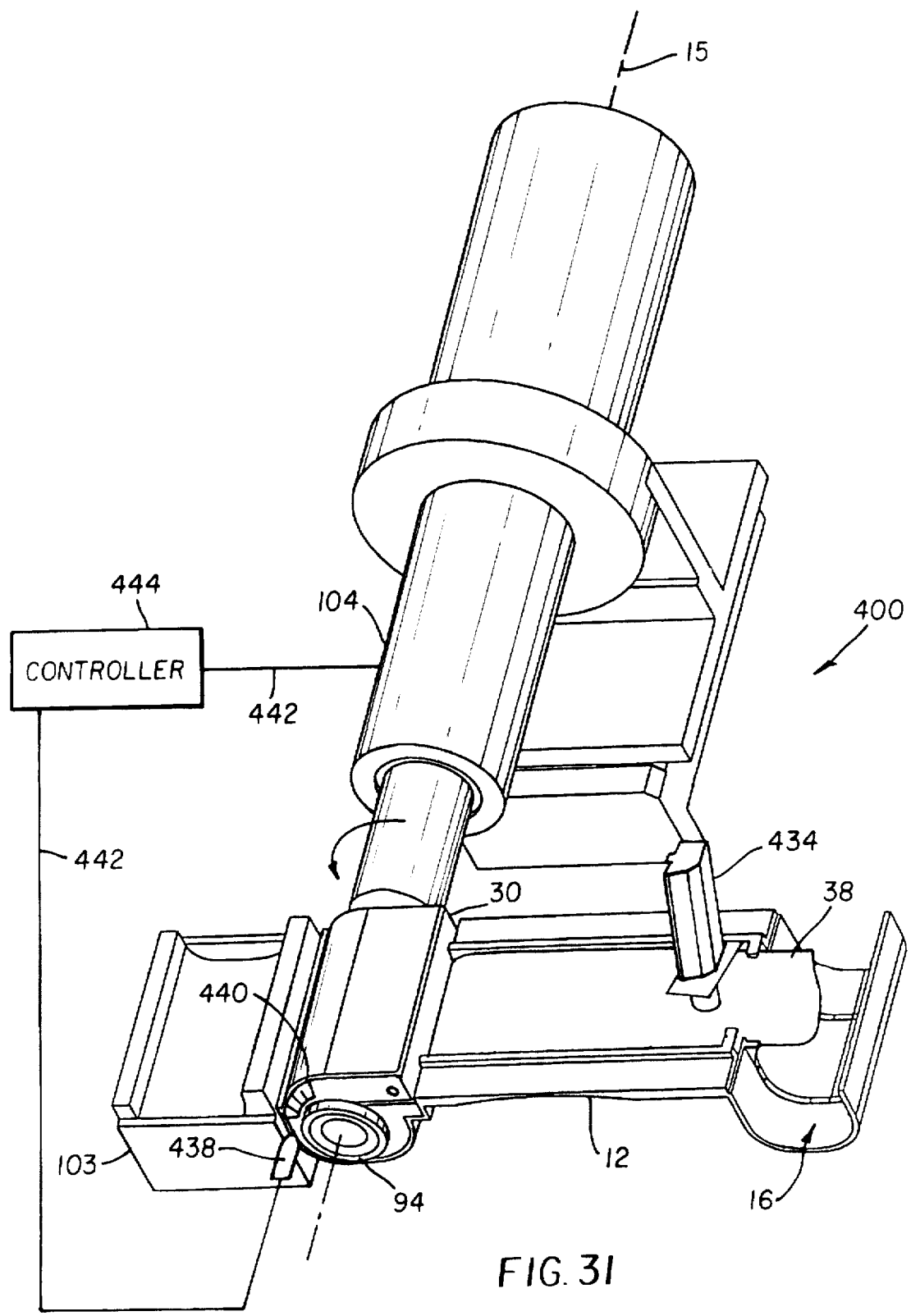

FIG. 31 is a perspective view of a spool repositioner of another embodiment of the apparatus, a camera frame

4 assembly, and part of the pallet. For clarity, the active light lock closer of the camera frame assembly is not shown.

Figure 32:
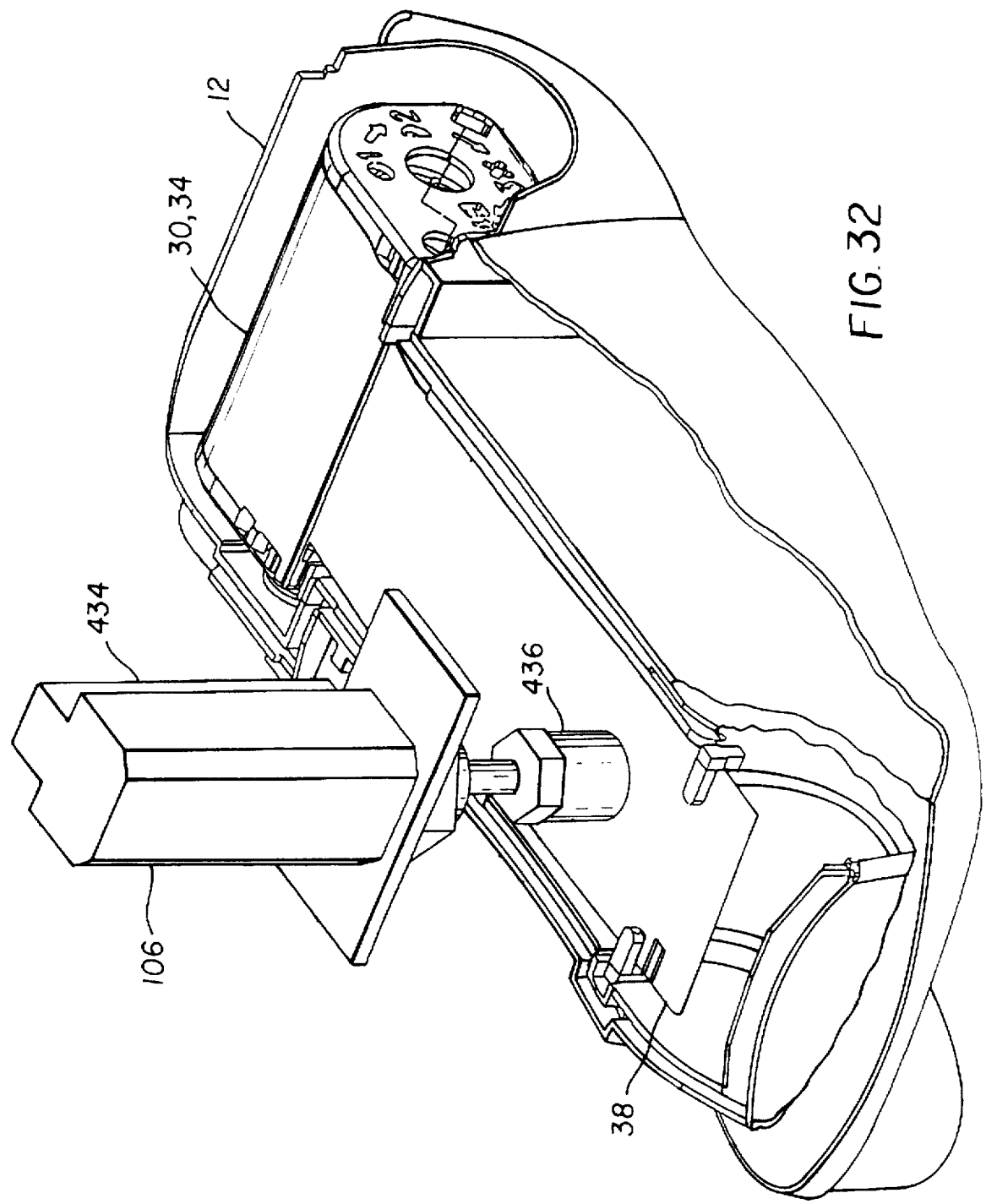

FIG. 32 is a perspective view of the holder of the spool repositioner of FIG. 31.

Figure 33:
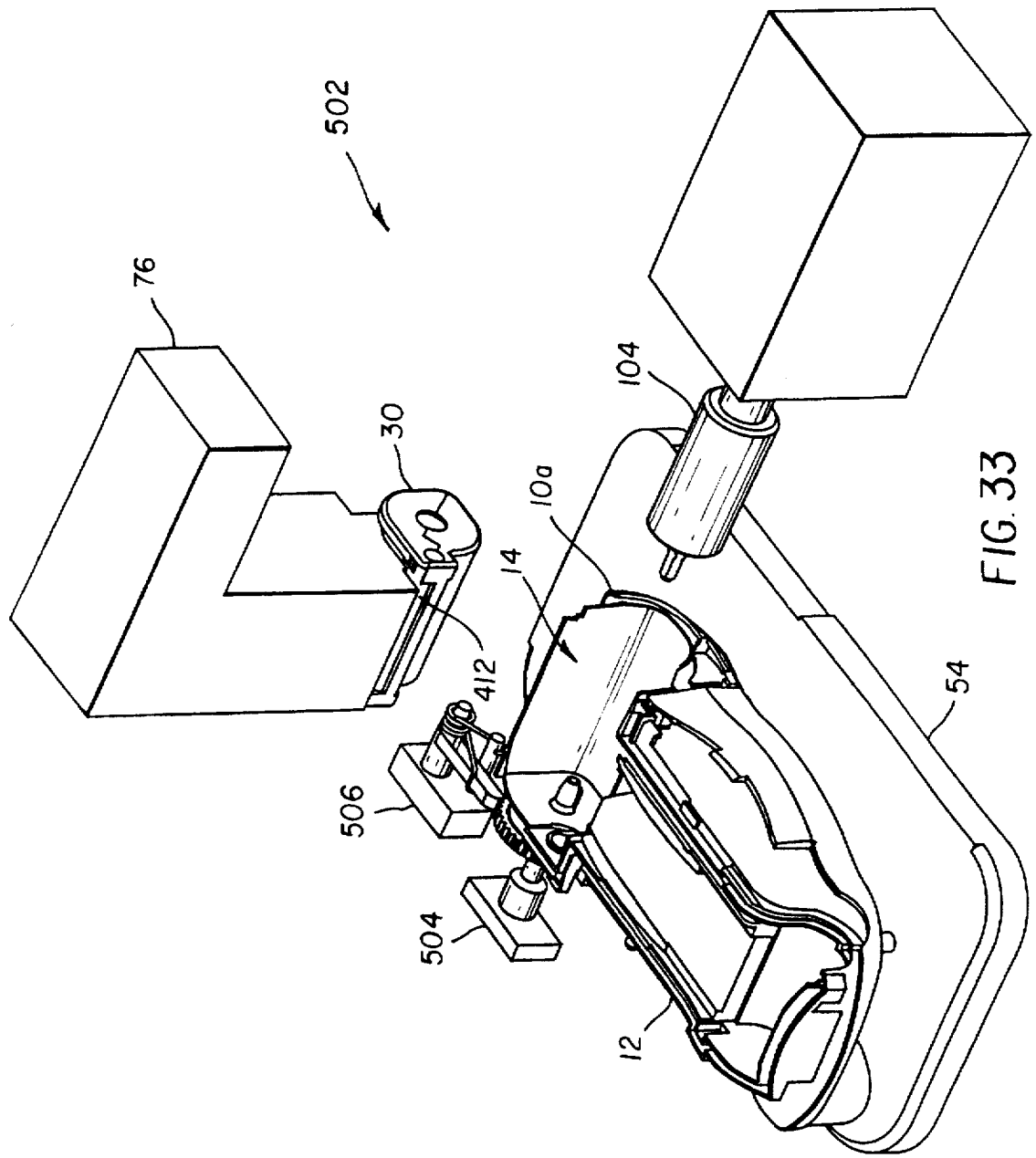

FIG. 33 is a perspective view of the cartridge positioner-thruster of another embodiment of the apparatus. The receiver of the apparatus and a camera frame assembly are also shown.

Figure 34:
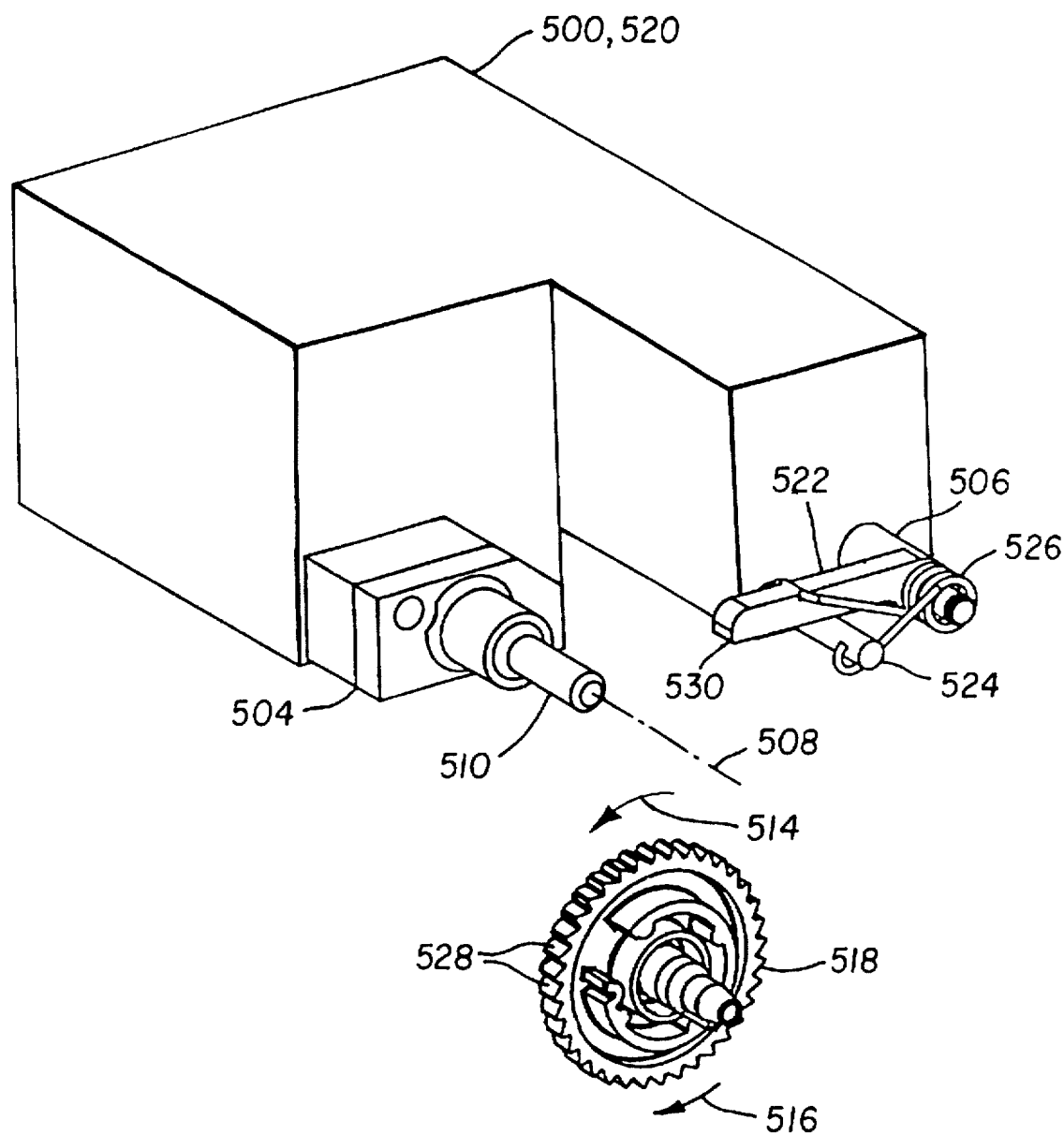

FIG. 34 is an enlargement of the view of the thumbwheel aligner of the cartridge positioner-thruster of FIG. 33. The view is partially exploded (the thumbwheel is shown displaced from the aligner).

Figure 35:
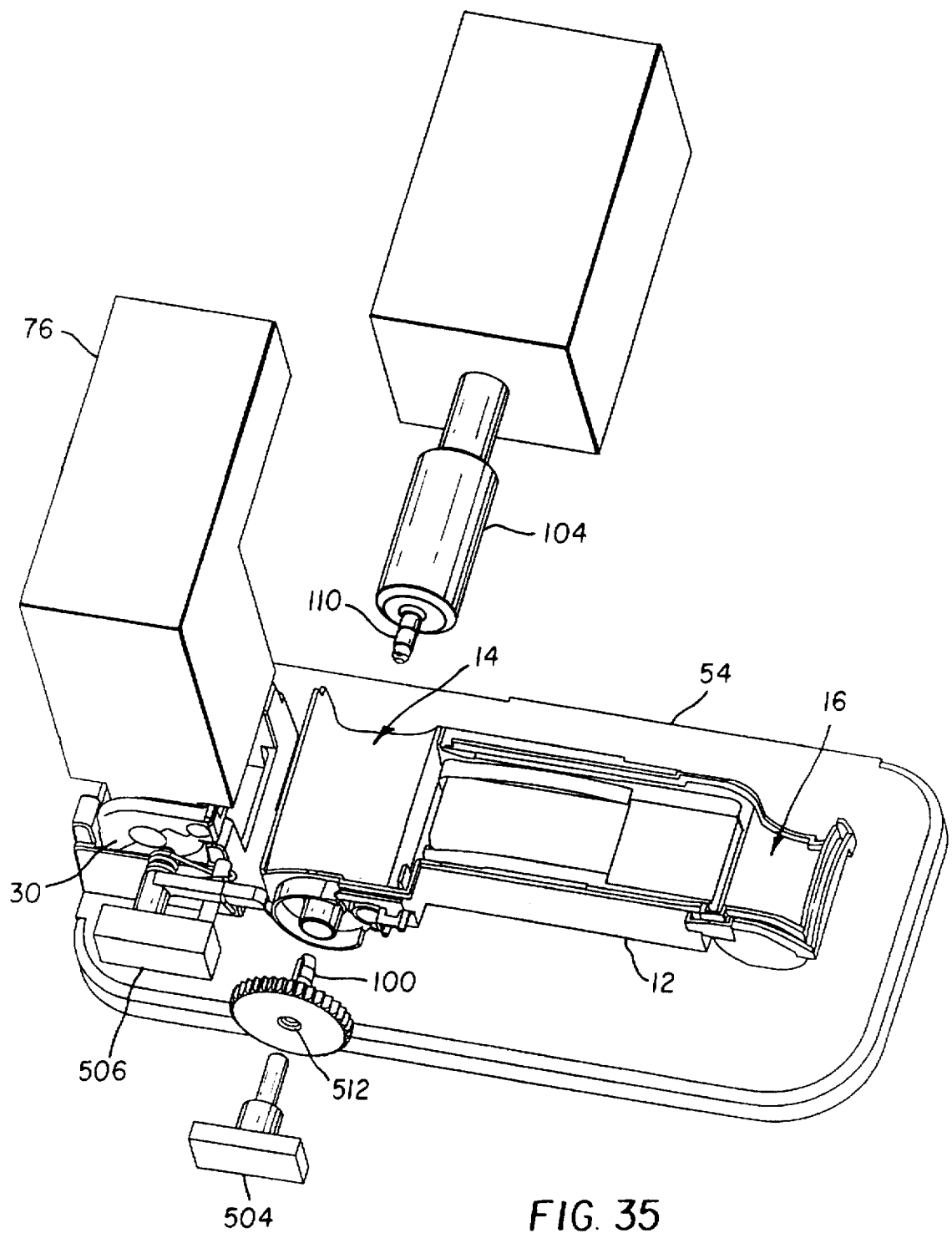

FIG. 35 is a perspective view of the cartridge positioner-thruster of FIG. 33 showing the cartridge being picked up from a nest by a cartridge mover. For clarity, the view is partially exploded (a jack of the aligner and the thumbwheel are displaced from the camera frame assembly and each other).

Figure 36:
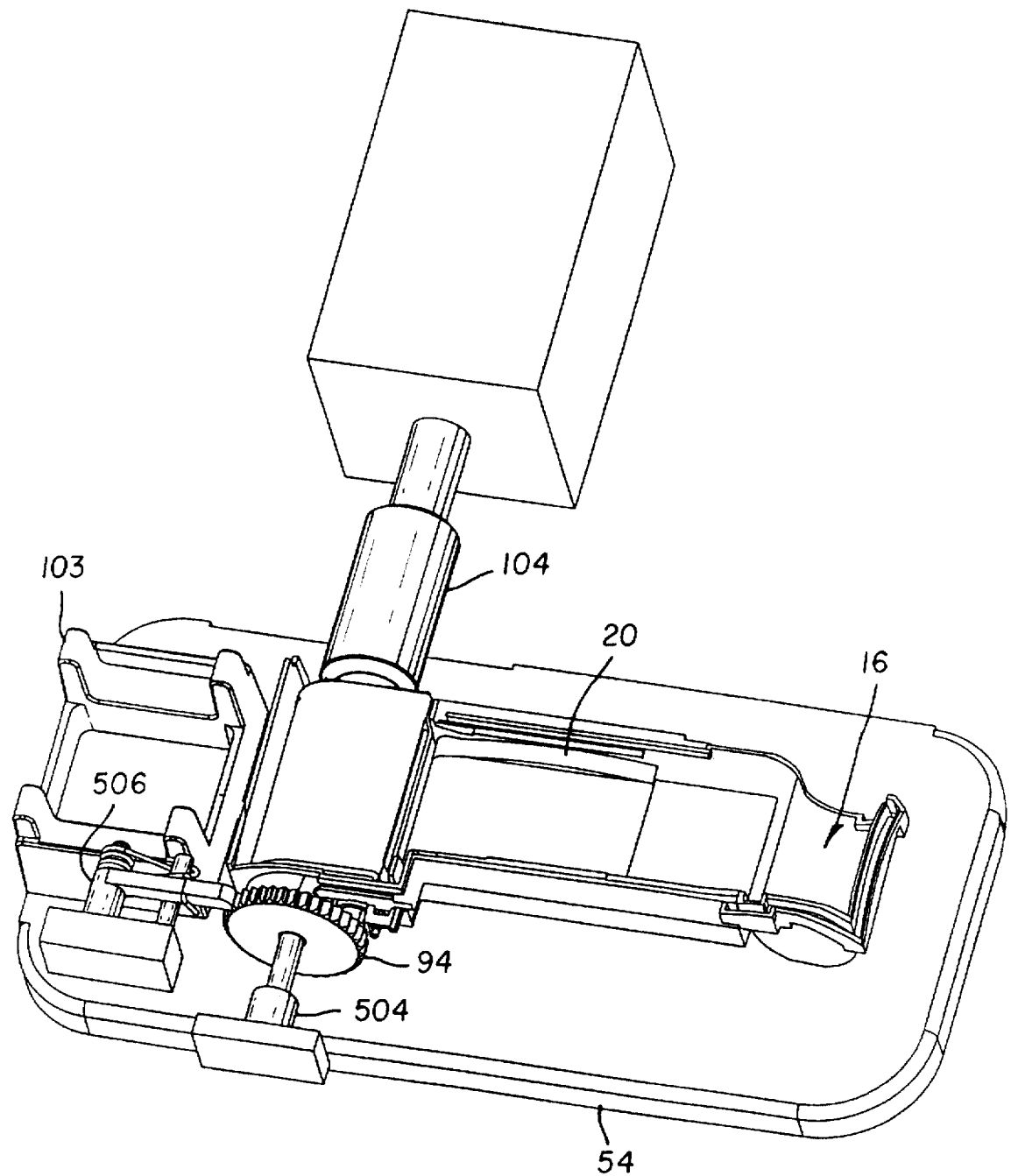

FIG. 36 is the same view as FIG. 35, after positioning and axial lodging of the cartridge in the supply chamber.

Figure 37:
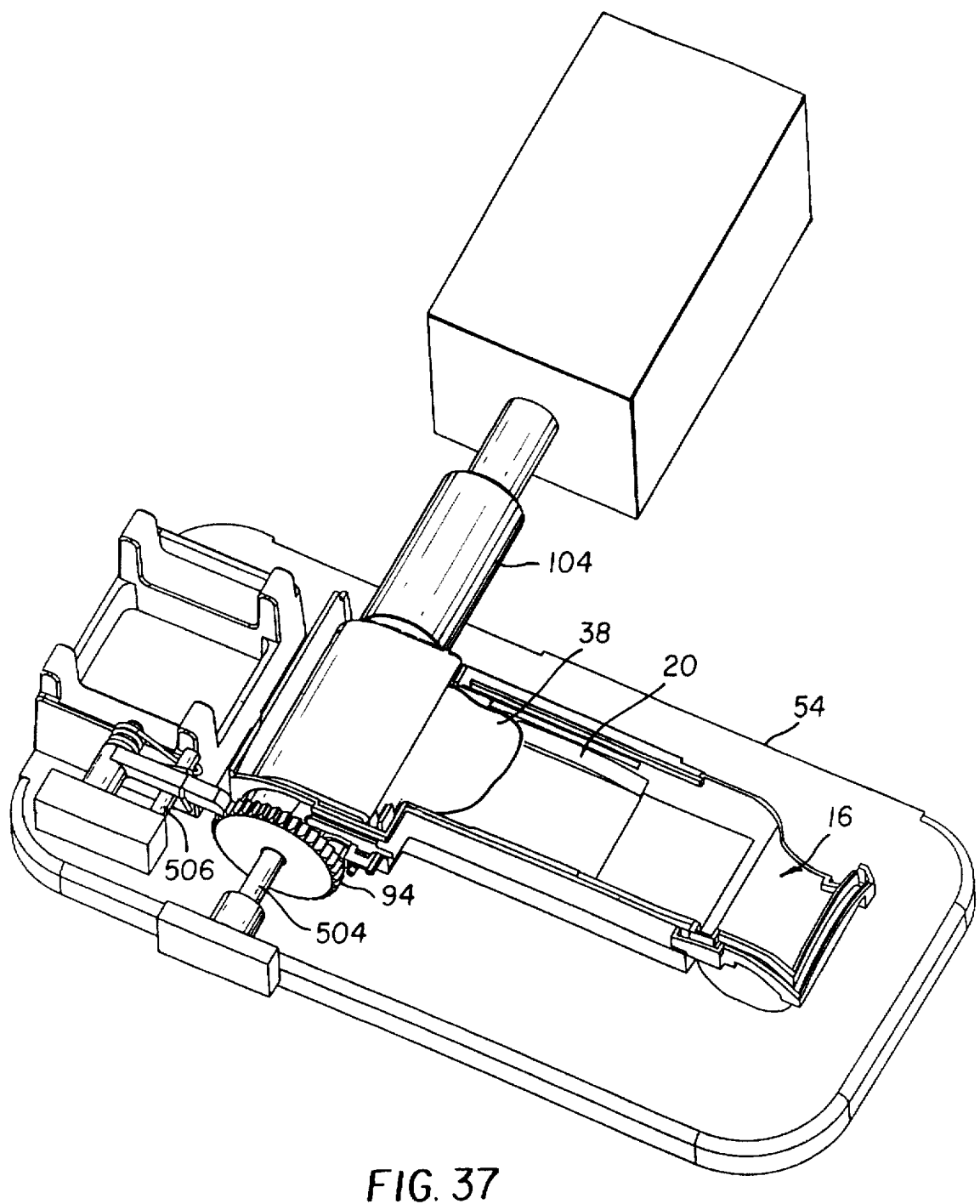

FIG. 37 is the same view as FIG. 36, after thrusting of the leading portion of the filmstrip from the film cartridge.

DETAILED DESCRIPTION OF THE INVENTION

In the apparatus and method of the invention, film is prewound in a camera frame assembly 10, that is, a camera or incomplete camera subunit, in a darkroom. The camera frame assembly 10 includes a camera frame 12 having a cartridge chamber 14 and a supply chamber or scroll chamber 16. The cartridge and supply chambers 14,16 each have a rearwardly facing throat or opening 15,17, respectively. The supply chamber 16 has one or two side openings 18 that are continuous with the throat 17. The camera frame 12 has an intermediate section or exposure frame 20 between the chambers 14,16. The supply chamber 16 has a concave interior wall 22 that defines a substantially cylindrical, internal film space 24 having a film space axis 26. The frame assembly 10 lacks a film spool or other axial film support, thus the film space 24 is empty, and remains empty except for the film roll. The frame assembly 10 defines a rear opening or rear accessway (indicated by dashed line 28 in FIG. 2) over the supply chamber and, preferably over both chambers 14,16 and the intermediate section 20.

The film cartridge 30 loaded into the frame assembly 10 includes a canister 32, a spool 34, and a filmstrip 36. The filmstrip 36 has a leading portion 38 having a free end 40, a tail portion or trailing portion 42, which is attached to the spool 34 in the canister 32, and a main portion 44 between the leading and tail portions 38,42.

The camera frame assembly can also include other camera components which have been previously installed on the camera frame. For example, the camera frame assembly 10 can include an exposure system 46, including one or more sub-components such as a baffle, a lens system, and a shutter. The frame assembly 10 can include a camera film drive 48 having a film engagement member (indicated diagrammatically in FIG. 2 by a semicircle 50) which adjoins the intermediate section 20 and engages film perforations (not shown) for film metering or for both film metering and film transport. A variety of such camera film drives are well known to those of skill in the art. In such drives, the film engagement member can be a linearly reciprocated pawl; however, a sprocket is more commonly used as the film engagement member. In many film drives for type 135 (35 mm.) film, the sprocket is a continuously toothed wheel. The sprocket rotates with film movement; but, at all times, part of the sprocket extends rearward from the intermediate section. In some film drives for APS film, the film engagement member is a skater or incompletely toothed sprocket in which an oval wheel has a pair of teeth at each end of the long axis and a toothless portion at each end of the short axis. With some film transport mechanisms, such as conventional sprocket types, it is necessary to lift film above the sprocket or other film engagement member during prewinding. With other film transport mechanisms, such as some skater types, the film can move past the skater or other film engagement member without causing it to rotate or otherwise actuate. The apparatus and method, in different embodiments, can accommodate either type of film transport mechanism.

The apparatus 52 includes a receiver 54, and active components 56 for cartridge loading, film transporting, and film winding. The method will be explained in relation to these components. The method is particularly suitable for prewinding film in one time use cameras; but is also suitable for prewinding reusable cameras marketed ready for use, that is, with a preloaded, prewound film cartridge. In the method, a film cartridge 30 is loaded into the cartridge chamber 14 of a camera frame assembly 10; and a filmstrip 36, attached at one end to a spool 34 in the cartridge 30, is wound into a film roll 62 in the other film chamber 16. After film rolling, the filmstrip 36 extends from the cartridge 30, over the intermediate section 20 to the supply chamber 16, and the major portion 44 of the filmstrip is a film roll 62 resting in the supply chamber 16.

The method begins with the provision of camera frame assemblies 10. These assemblies can be manufactured as a part of a continuous process with the method or can be manufactured in an independent process. The camera frame assemblies 10, however prepared, are placed on the receiver 54 of the apparatus 52.

Figure 4:
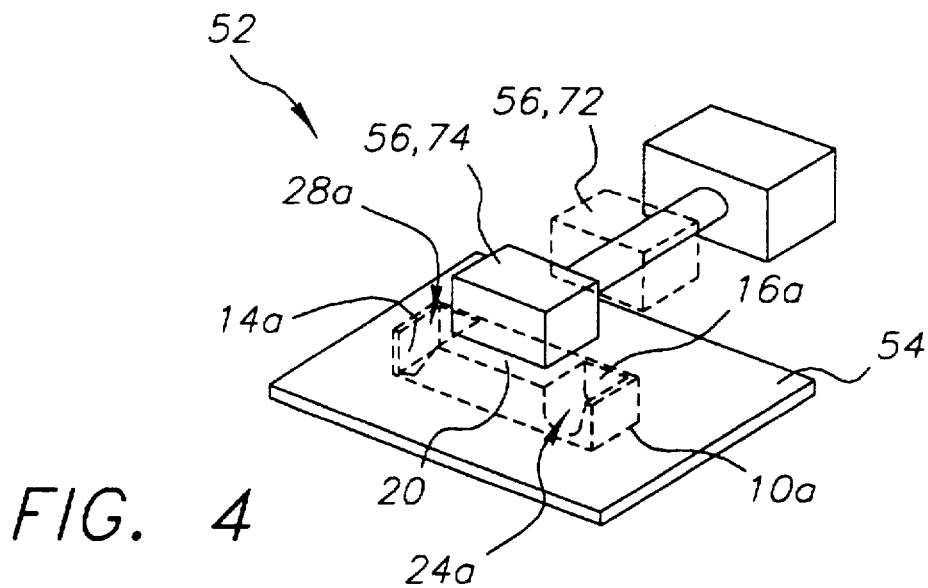
FIG. 4 is a semi-diagrammatical perspective view of an embodiment of the apparatus.

The receiver 54 supports the camera frame assembly 10 in a predetermined loading position 10a or series of positions 10a relative to the components 56 of the apparatus 52. The receiver 54 has a predetermined relationship to the other components 56 and thus, during assembly, defines a predetermined relative location or site for each of the chambers, throats, intermediate section, film space, and rear opening. (Sites correspond to features of the frame assembly and are necessarily predetermined for a particular frame assembly by adjusting physical constraints such as relative positions of the receiver and other components of the apparatus. In FIG. 4, representative sites are indicated in dashed lines and by references numbers identical to those of similarly named frame assembly features, but with the letter "a" added.) The receiver 54 can accept the camera frame assembly 10 directly or can be adapted to accept a pallet or nest 64 or the like. In that case, the camera frame assembly 10 is held in a predetermined relation to the pallet or nest 64, which in turn in held in a predetermined loading orientation by the receiver 54. Indexing features 65 can be provided on the pallet to permit the camera frame assembly 10 and the receiver 54 to be readily aligned. The frame assembly 10 can be provided to the receiver 54 premounted on a pallet or the pallet and frame assembly can combined on the receiver.

The receiver 54 can have a variety of features for supporting automated assembly operations. For example, the apparatus can include a positioner, indicated schematically in FIG. 1 by positioner 66, for moving a camera frame assembly 10 between the apparatus and one or more other assembly stations or between stations having different components of the apparatus. As a matter of convenience, the following discussion is generally directed to an apparatus 52, like that shown schematically in FIG. 5, in which components 56 are divided among a series of different stations 68 and the receiver 54 is a movement system conveying the frame assembly 10 from station to station. The apparatus components 56 can each include an actuation mechanism 70. The mechanisms 70 can include a retraction-extension system for moving the respective component between a non-use position 72, in which the component is clear of the receiver, and a use or active position 74. The actuation mechanism can also include other parts for imparting motion to components, such as rotary or linear drives.

After the frame assembly 10 has been placed on the receiver 54, a film cartridge 30 is positioned in the cartridge chamber 14 of the frame assembly 10 and the filmstrip is advanced across the intermediate section 20.

Figure 6:
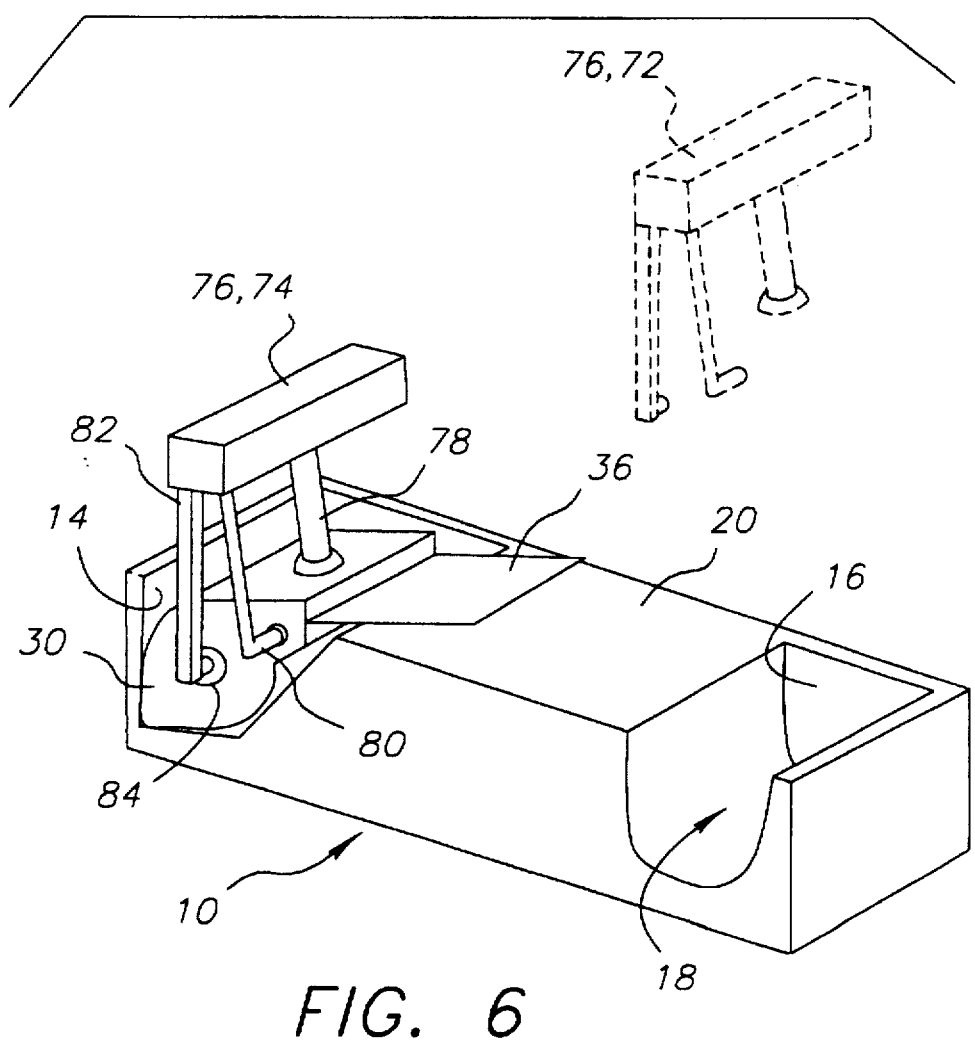
FIG. 6 is a semi-diagrammatical perspective view of a cartridge moving station of an embodiment of the apparatus.

Referring now an embodiment shown in FIG. 6, the apparatus 52 include a cartridge mover 76 for positioning the cartridge 30 in the cartridge chamber 14. The cartridge is positioned in alignment with the cartridge chamber axis 15; that is, the long dimension of the cartridge and the axis of the cartridge spool are lined up with the long dimension of the cartridge chamber. It is desirable that the cartridge chamber follow the ordinary practice in camera manufacturing and be sized to preclude placement of a cartridge within the cartridge chamber in non-alignment with the cartridge chamber axis 15. The cartridge is also positioned adjoining the thumbwheel in close axial proximity. It is highly desirable that the axial proximity be very close, that is, at a small fraction of the length of the cartridge chamber away from the thumbwheel, since more distant positioning presents a risk of the cartridge tilting away from the chamber axis when the cartridge is later moved toward the thumbwheel.

The cartridge mover 76 has a vacuum gripper 78 which allows the cartridge mover 76 to position the cartridge 30 in the cartridge chamber 14 and, optionally, to continue to grip or constrain the cartridge 30 during film winding. The cartridge 30 can be released after film winding is completed. This is convenient if the camera frame assembly 10 lacks features to prevent oscillation or other movement of the film cartridge 30 during film winding. The cartridge mover 76 can support other components, such as an active light lock opener 80 and a spool rotator 82. The active light lock opener 80 is pivoted to open the active light lock of a suitable film cartridge, such as an Advanced Photo System™ (APS™) cartridge, prior to placement of the cartridge in the cartridge chamber site. This allows the camera frame assembly to include a detent (not shown) which retains the active light lock in the open position during film use. The spool rotator 82 engages the spool 34 of the cartridge 30 and rotates the spool 84 to thrust the filmstrip 36 from the cartridge 30.

Figure 1:
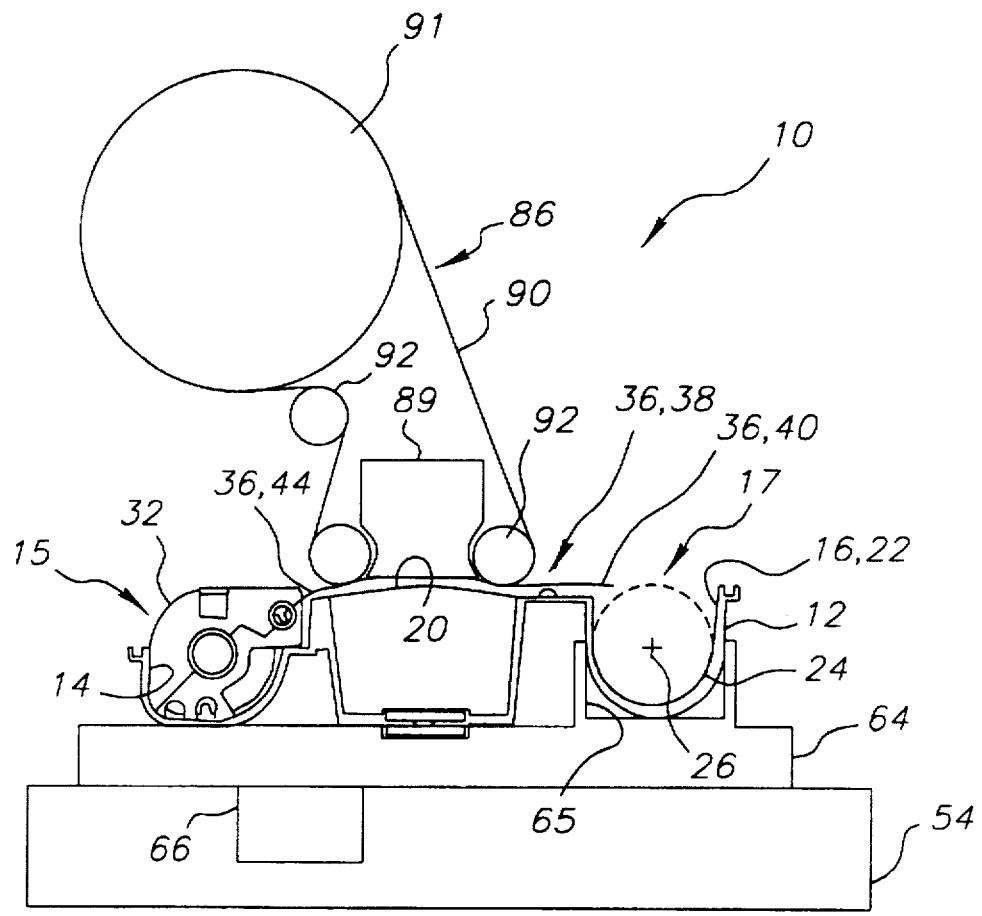
FIG. 1 is a semi-diagrammatical view of a station of an embodiment of the apparatus, showing a receiver and film bridge. A pallet rests on the receiver. The pallet bears a camera frame assembly (shown in cross-section) and a cartridge. The film space is indicated by dashed lines. The film space axis is indicated by a cross. The invention is not limited to a particular camera frame assembly and various alternative camera frame assemblies are illustrated in the figures. Features of some camera frame assemblies are deleted for clarity.
Figure 7:
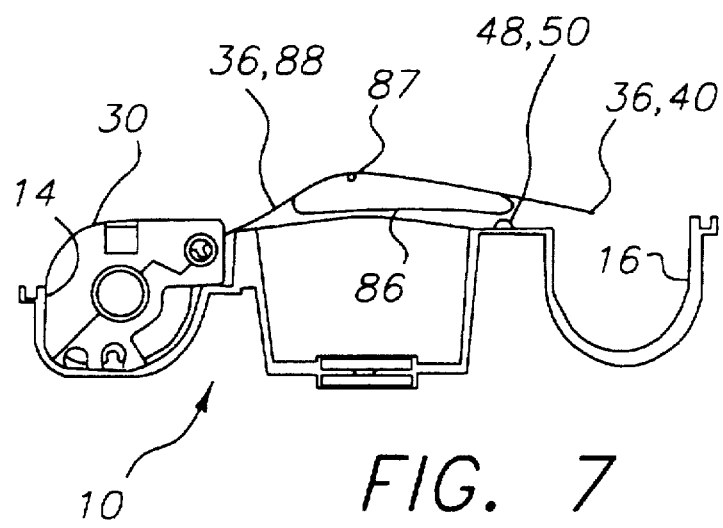
FIG. 7 is a semi-diagrammatical side cross-sectional view of a film transporting station of the embodiment of the apparatus of FIG. 6.

Referring now to FIGS. 1 and 7, in some embodiments, a film bridge 86 is next moved, relative to the frame assembly 10, to an active position over the intermediate section 20 of the frame assembly. This can be accomplished in the same station 68 or the frame assembly 10 can be moved to a new station 68 that includes a film bridge 68. The film bridge 86 defines a film path 88 extending from the cartridge chamber 14 to the supply chamber 16. (In FIGS. 1 and 7, the film path 88 is occupied by the filmstrip 36.)

In embodiments in which the frame assembly 10 has a film engagement member 50, such as a conventional sprocket, that continuously extends outward from the intermediate section 20; it is preferred that the film path 88 be spaced apart from the intermediate section site 20a, since this separates the filmstrip 36 from the camera film drive, which thus does not need to be disabled or the like during film roll formation. Within these constraints, the film bridge 86 can take a variety of forms. For example, the film bridge 86 can be a turtleback as shown in FIG. 7. It is preferred that the turtleback present minimal friction to the filmstrip. The turtleback can provide one or more friction reducing features (indicated by item 87 in FIG. 7); such as holes and a pressurized gas connection for an air cushion or rotary bearings.

It is highly preferred that the film bridge 86 include a film transport, disposed in operative relation to the film path 88, to propel the filmstrip along the film path to the supply chamber. Examples of film bridges that include a film transport include a capstan drive; a vacuum shuttle, such as that disclosed in U.S. Pat. No. 5,125,630; and an endless belt mechanism. The endless belt can be disposed between the filmstrip and the intermediate section 20 of the camera frame assembly or, as shown in FIG. 1 can overlie the filmstrip 36. In the latter case, the endless belt mechanism can have holes (not shown) and include a vacuum-compressed gas unit 89 to provide a vacuum and pull the filmstrip against the belt 90 for transport, and direct compressed gas against the filmstrip 36 to release the filmstrip from the belt 90. The mechanism includes a belt drive 91 and idler rollers 92 which position and tension the belt 90.

FIGS. 8–12 illustrate alternative embodiments of the apparatus which are used with a frame assembly 10b that includes a thumbwheel 94 which is mounted to an endwall 96 of the cartridge chamber 14. The thumbwheel 94 is attached to the frame 12 and, as attached, is free to rotate relative to the frame 12. The thumbwheel 94 has a rotation member 98 which, in the completed camera, is turned to advance film. The thumbwheel 94 has an axially positioned drivekey 100, which extends into the cartridge chamber space 14b. A collar or resilient flange or the like (not shown) holds the thumbwheel 94 in place on the frame 12. The thumbwheel drivekey 100 is complementary in shape to an axial cut-out or engagement portion 102 of the spool of either a standard film cartridge or a cartridge with a cut-out of unique shape for use in the specific camera. For use with APS film, the drivekey 100 has the shape shown in FIG. 9 and can mate with the cut-out 102 of the cartridge spool 84 in only a single orientation.

Figure 5:
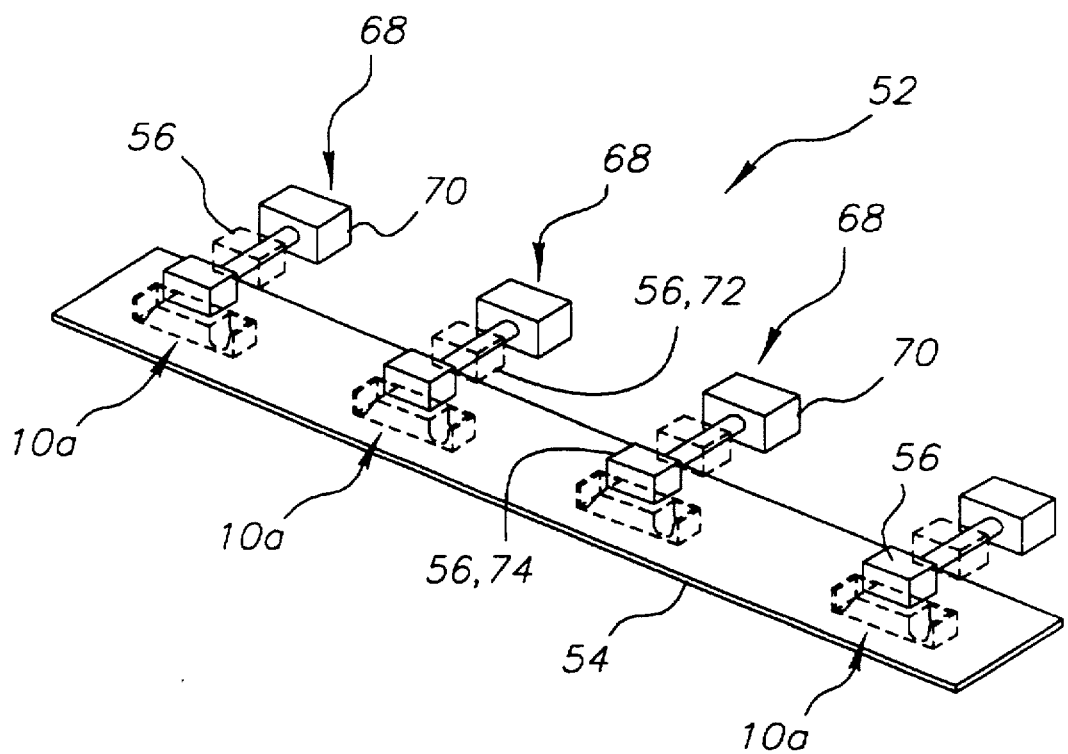
FIG. 5 is a semi-diagrammatical perspective view of another embodiment of the apparatus.

Referring now to FIGS. 5, and 8, in a first station 68, a camera frame assembly is placed on a pallet 64, by a suitable component 56, such as a pick and place device. Referring now to FIG. 8, in the same or a second station 68, a first cartridge mover 76, such as a vacuum gripper, grips an APS or similar film cartridge 30 from a bin or other store (not shown) and places the cartridge 30 within a cartridge nest 103 on the pallet 64. While the cartridge 30 is gripped, an active light lock opener 80 (shown for a different embodiment in FIG. 6) engages and rotates the active light lock 90 degrees to fully open the film exit of the cartridge 30. In the embodiment of FIG. 6, the active light lock opener 80 is illustrated as sharing a common support with the vacuum gripper 76; however, it will be understood that this and other components 56 of the apparatus 52 could be mounted separately or commonly in a wide variety of different ways. In the above discussed embodiment, the apparatus components 56 are next retracted from the frame assembly 10 and the pallet 64 is moved on the receiver 54 to the next station 68.

Referring to FIGS. 5, 8 and 9, in the same station 68 or a third station 68, a the same or a second cartridge mover 76 grips the cartridge 30 and positions the cartridge 30 in the cartridge chamber 14 in close axial proximity to the drivekey 100 of the thumbwheel 94. The cartridge 30 is not moved so far into the cartridge chamber space 14b as to engage the cut-out 102 of the cartridge spool 84 and the thumbwheel drivekey 100. The reason is that in a film cartridge like an APS cartridge, the opening of the cartridge door unlocks the film spool. Thus, the engagement portion 102 and drivekey 100 may be misaligned and it is undesirable to force the parts together. The cartridge mover 76 is withdrawn and the frame assembly 10b is moved on to the next station 68.

Referring now to FIGS. 9–10, in the same station or a fourth station, a quill 104 is moved, by a linear actuator 106, in an axial direction (indicated by arrow 108) relative to the spool 84 of the film cartridge 30. The quill 104 has a quill drivekey 110 that is complementary in shape to a second cut-out or engagement portion 112 (indicated by dashed lines in FIG. 9) of the cartridge spool 84. The cut-outs 102,112 at opposite ends of the cartridge spool 84 may have the same shape or may differ. A clamping member 114 is moved, as indicated in FIG. 9 by two-headed arrow 116, from a non-use position spaced from the supply chamber site 14a to a use position in which the clamping member 114 bears against the thumbwheel 98, which clamps the thumbwheel 98 and prevents rotation of the thumbwheel 98 relative to the frame 12. A light axial load (supplied by actuation device 106) on the quill 104, urges the quill 104 against the cartridge spool 84, and the cartridge spool 84 against the drivekey 100 of the thumbwheel 94. At the same time, the quill 104 is rotated by actuation device 70 in a backward direction (indicated by arrow 116); that is, the quill 104 is rotated in a direction of rotation that, if applied to the cartridge, would withdraw an extended filmstrip back into the cartridge. This is the rewind direction for the film cartridge, that is, the direction the spool is rotated to rewind film back into the cartridge. With a thrust type film cartridge, this direction is also opposite to that of film thrusting. The rotation of the quill 104 causes one, and then another, of the drivekeys 100,110 and respective cut-outs 102,112 to be aligned within two revolutions of the quill 104. When the first cut-out 102 of the spool 84 and the thumbwheel drivekey 100 are aligned, the cartridge 30 moves axially (generally in the direction indicated by arrow 108) under the force applied by the quill 104, relative to common thumbwheel and cartridge axes 116,118, until the first cut-out 102 has moved into mating engagement with the thumbwheel drivekey 100 and the cartridge is seated against the thumbwheel 94 and endwall 96. Similarly, when the second cut-out 112 of the spool 84 and the quill drivekey 110 are aligned, the drivekey 110 moves axially into the second cut-out 112. The drivekey 110 of the quill 104 can be spring-loaded to moderate the force applied by the quill 104 and prevent possible jamming, during quill movement prior to mating engagement of both pair of cut-outs 102,112 and drivekeys 100,110. After the cartridge has been seated, the clamping member is retracted from the thumbwheel. The spring loading can be axial only or can provide both for resilience in an axial direction and in one or more other directions to accommodate possible misalignments of the quill and the cartridge and thumbwheel axes.

In a particular embodiment, the second spool cut out 112 is circular or similarly radially symmetrical except for a radial slot 109. In that embodiment, the quill drivekey 110 includes a detent or key member 111 that is configured to fit in the slot 109. The key member 111 is movable independent of the body 113 of the drivekey 110 in directions (indicated by arrow 115) substantially radial to the axis of rotation of the quill and is resiliently biased outward. The key member 111 allows the quill drivekey to enter the cut out 112 while radially misaligned. The quill drivekey 110 can then spin within the cut out 112 until the key member 111 becomes aligned and resiliently moves into the cut out 112.

The discussion here is primarily directed to an embodiment using an APS cartridge; however, this procedure is applicable to both thrust-type film cartridges, such as APS cartridges, and non-thrust type cartridges, such as type 135 cartridges. In the latter case care must be taken to avoid withdrawing all the leader into the cartridge during cartridge seating.

A detector 120 can be mounted in operative relation to the cartridge chamber space 14a to sense axial motion of the cartridge 30, or the like. The detector 120 can be integrated into a control system, which can stop the operation and withdraw the quill if a fault condition is detected.

Referring now to FIGS. 11–13, next, the quill is driven by the quill motor or actuation mechanism 70 in a forward direction (indicated by arrow 122), rotating the cartridge spool and thrusting a leading portion 38 of the filmstrip 36 from the cartridge 30. This can be most conveniently accomplished at the same assembly station as was used for seating the cartridge. The thrusting of the film can be continued until the free end 40 of the filmstrip 36 is impelled into the supply chamber. A detector 124 can be positioned to sense optically or in some other manner when the free end 40 reaches the supply chamber space 16a and signal the controller (not shown) to stop thrusting.

In a particular embodiment, the frame assembly has film retention fingers 126, as disclosed in U.S. patent application Ser. No. 08/796,155, entitled "ONE-TIME-USE CAMERA HEAVING MAIN BODY PART AND INSERTABLE LIGHT BAFFLE WITH FILM HOLDERS TO FACILITATE CAMERA ASSEMBLY", filed Feb. 6, 1997, by Douglas H. Pearson, which is hereby incorporated herein by reference. The film retention fingers 126 define a film entrance 128 leading into the supply chamber space 16a. In this embodiment a film guiding member 130 directs the free end 40 of the filmstrip 36 through the film entrance 128 and into the supply chamber space 16a. The film guiding member 130 is lowered into position over the intermediate section 20 of the frame assembly 10, by a linear actuator 106, prior to or during film thrusting, at the same station as is used for cartridge seating or at a succeeding station (as shown in FIG. 12). The film guiding member 130 has a concave bottom 132 overlying the intermediate section 20. The film guiding member 130 has pockets 134 which receive the film retention fingers 126 such that the film entrance 128 defined by the film guiding members 126 lies on an ellipse defined by the concave bottom 132 of film guiding member 130. The detector 124 can be conveniently housed in the film guiding member 130.

Referring now particularly to FIGS. 14–20, after the free end 40 of the leading portion 38 of the filmstrip 36 has been advanced to the supply chamber 16, the frame assembly 10 is moved to another station 68. In this station 68, a mandrel or a spool 136 attached to the apparatus 52, is introduced into the supply chamber 16 along with one or, preferably, a plurality of film guides 138. The guides 138 define a substantially cylindrical preliminary film space 140 within the supply chamber 16, centered on the mandrel 136. The preliminary film space 140 has a radius 142, (referred to hereafter a the "preliminary radius 142") that is predetermined by the internal configuration of the film guides 138.

The leading portion 38 of the filmstrip 36 is transported into the preliminary film space 140 and curled about the mandrel 136 and a curling axis (indicated by a cross 144 in FIG. 14). The curling axis 144 is disposed within the supply chamber 16 and is, at the time of curling, coextensive with the axis of rotation of the mandrel.

The guides 138 are interposed between the interior wall 146 of the supply chamber 16 and the mandrel 136 and both guide the leading portion 38 of the filmstrip 36 around the mandrel 136 and limit deflection of the filmstrip 36 in directions radial to the common axis of rotation of the mandrel and the curling axis 144. The initial turn (not separately shown) of the filmstrip 36 is cinched to the mandrel 136, the guides 138 are retracted from the supply chamber (in currently preferred embodiments in a direction parallel to the curling axis, and the majority of the filmstrip 36 is wrapped around the initial turn to form a film roll 62 (shown in FIGS. 2 and 3).

The mandrel 136 is preferably a vacuum mandrel, that is, a hollow cylinder perforated on the longitudinal surface by air passages 148 and is connected to a vacuum pump or negative air pressure source (not shown). As the leading portion 38 of the filmstrip 36 curls about the mandrel 136, the vacuum urges the filmstrip 36 into contact with the mandrel 136. The mandrel 136 is rotated about the mandrel axis 150, starting either before or after the free end 40 of the filmstrip 36 contacts the mandrel 136 and the leading portion 38 of the filmstrip 36 is overlapped and cinched against the mandrel 136, after which the main portion 44 of the filmstrip 36 is wound over the first turn of film roll.

Referring particularly to FIGS. 14–15, the guide or guides 138 can be relatively simple. For example, as shown in FIGS. 14–15, a simple cinch dog 152 having a hook-shaped cross-section can be used. The cinch dog 152 is positioned in the supply chamber 16 with the shank 154 toward the distal side 155 and the opening of the hook 156 facing the direction of entry of the filmstrip 36 into the supply chamber 16. After the filmstrip is cinched, the cinch dog 152 is withdrawn, in an axial direction, from the film chamber 16. In this embodiment, the mandrel 136 can be lowered into the supply chamber 16 during film winding (in the direction indicated by arrow 158 from an alternative curling axis indicated by circled cross 160) so as to continuously maintain tangency between the apex or outermost turn of the film roll and the film entrance 128 or downstream end of the film bridge 86 so as to minimize the force applied to the filmstrip 36 during winding. Thus, in this embodiment, the axis of rotation of the mandrel 136 is moved away from the curling axis 160 during winding, and deeper into the supply chamber 16.

Referring now to FIGS. 16–20, in preferred embodiments, an assemblage of multiple film guides 138 are used. The multiple guides 138 surround the mandrel 136, in directions radial to the mandrel axis 150, except for an entry 162 through which the filmstrip is admitted. In these embodiments, the film guides 138 preclude the leading portion 38 of the filmstrip 36 from deflecting in directions radial to the axis 150 of the mandrel beyond a preliminary radius 142 defining the limits of the preliminary film space 140. The leading portion 38 of the filmstrip 36 is thus isolated from the interior wall 146 of the supply chamber 16 as the leading portion 38 is curled about the mandrel 136 and cinched. The mandrel axis 150 and preliminary film space axis are coextensive. The mandrel 136 can be lowered into the supply chamber 16 during film winding to maintain tangency between the outermost turn of the film roll and the section of the filmstrip 36 entering the film supply chamber 16. In particular embodiments, the frame 12 has film retention fingers 126 and the mandrel 136 is kept in a central position within the supply chamber 16 during film winding. The latter approach has the advantage of requiring simpler equipment for moving the mandrel 136. In a particular embodiment, shown in FIGS. 16–20, in which the mandrel 136 is kept in a fixed position, the mandrel 136, preliminary film space 140, and film supply chamber 16 all have a common axis 150.

In this embodiment, the assemblage of guides 138 includes separable upper and lower guides 164,166, respectively. It is preferred that the lower guide 166 is an arcuate partial sleeve or cinch sleeve having a C-shaped cross-section. The partial sleeve 166 has a concave inner surface 168 that is smooth or otherwise configured to present a low frictional load to the filmstrip. The inner surface 168 of the partial sleeve 166 closely adjoins the mandrel 136. In a particular embodiment the separation is a few times the thickness of the filmstrip 36, about 1 mm. The partial sleeve 166 is coaxial or substantially coaxial with the mandrel 136 and extends around more than half (more than 180 degrees) of the interposed mandrel 136. The lower guide 166 has a distal edge 170 that is at least roughly parallel to the mandrel axis 150 and a horizontal diameter of the mandrel 136. The lower guide 166 has a medial edge 172 that is roughly parallel to the mandrel axis 150 and an imaginary horizontal line tangent to the mandrel 136. (Terms "horizontal" and "vertical" and the like, are used herein in a relative sense in which the longest dimension of the frame assembly defines a "horizontal" direction. Actual orientations may vary as desired, taking into account the effect of gravity on loose parts.)

It is preferred that the upper guide 164 is a guide shoe that is movable independent of the partial sleeve 166. The guide shoe 164 has an arm 174 that extends down and closely adjoins or contacts the distal edge 170 of the partial sleeve 166. The arm 174 can be continuous or can be divided into two discontinuous portions as shown in FIGS. 16–20. The arm 174 has a concave, low friction inner surface 176. The arm 174 has a lower edge 178 that meets with the distal edge 170 of the partial sleeve 166 so as to present a guidepath to the filmstrip 36 that is substantially free of discontinuity. The lower edge 178 and distal edge 170 can meet so as to provide a continuous curve, interrupted only by a narrow seam. Alternatively, the lower edge 178 can extend radially inward beyond the distal edge 170 so as to define a guidepath for the filmstrip in which the filmstrip jumps the discontinuity between the edges 78,170. The latter approach has the advantage that slight misalignment errors do not present a risk of gouging the filmstrip.

The guide shoe 164 has a bearing member 180 medial (toward the left in FIG. 20) to the guide shoe arm 174. The bearing member 180 is positioned so as to be separated from the mandrel 136 by a nip 182 when the upper and lower guides 164,166 are in operating position within the supply chamber 16 and the filmstrip 36 is in place between the mandrel 136 and the bearing member 180. The bearing member 180 can be compressible or resiliently mounted such that the nip 182 is at least partially a function of bearing member deflection during use or the bearing member can be a rigidly mounted, incompressible part. The bearing member 180 can be an immobile skid or bushing which the filmstrip slides past. The bearing member 180 can also be a rotary member such as a driven roller or belt or the like, which rotates at the same or a different speed than the mandrel. There are disadvantages in driving the bearing member, however, since relative differences in the speed of the film and the bearing member present a risk of scuffing or other wear on the filmstrip. It is thus preferred that the bearing member be an unpowered rotary member, such as an idler roller 180 that freely rotates with the passage of the filmstrip and presents a low frictional load to the filmstrip. For the same reason, it is preferred that the idler roller 180 rotate about an axis parallel to the axis of the mandrel 150.

The width of the bearing member 180 in a direction parallel to the mandrel axis 150 is not critical, however, a relatively narrow bearing member presents less spatial constraints for other components of the apparatus, ancillary equipment and the like. A convenient width for the bearing member 180 is less than about one-half the width of the filmstrip. In the embodiment of FIGS. 16–20, the bearing member or idler roller 180 has a width that is about one-quarter of the width of the filmstrip 36.

The idler roller 180 can have a flange (not shown) that extends outward from the rest of the roller radial to the roller axis. The flange can help maintain alignment of the leading portion of the filmstrip and the mandrel by limiting both lateral movement and torqueing of the filmstrip about its longitudinal axis. The flange may be superfluous if the front end of the supply chamber is closed.

The guide shoe 164 includes a support portion 184 that provides physical support for the arm 174 and bearing member 180. For example, the support portion in FIGS. 16–20, carries the axle of the bearing member 180. The support portion 184 is preferably configured so as to avoid any possibility of unintended contact with the filmstrip. As shown in FIG. 20, in particular embodiments the support portion 184 can be joined to another component 56, such as a film bridge or film guiding member, as a single unit.

The assemblage of guides can include a film stripper 186. The stripper 186 has a shoulder 188 (best seen in FIG. 18) that defines a lateral boundary for the film roll. The stripper 186 can have a dimension in directions radial to a stripper axis, that is smaller, the same as, or larger than the dimensions of the supply chamber in the same directions. In a particular embodiment, the stripper 186 is a complete sleeve that is coaxial with the mandrel 136 and is separated from the mandrel 136 by less than the thickness of the filmstrip 36 and, preferably, about one-half the thickness of the filmstrip. In this embodiment, the dimensions of the stripper 186 in directions radial to the stripper axis (which is coextensive with the mandrel axis 150), are less than the dimensions of the preliminary film space 140 in the same directions and the partial sleeve 164 is coaxial with the stripper 186. This permits the mandrel 136, partial sleeve 164, and the stripper 186 to move along a common axis, independent of each other and without interference; and, at the same time, keeps overall apparatus and supply chamber dimensions small.

Figure 2:
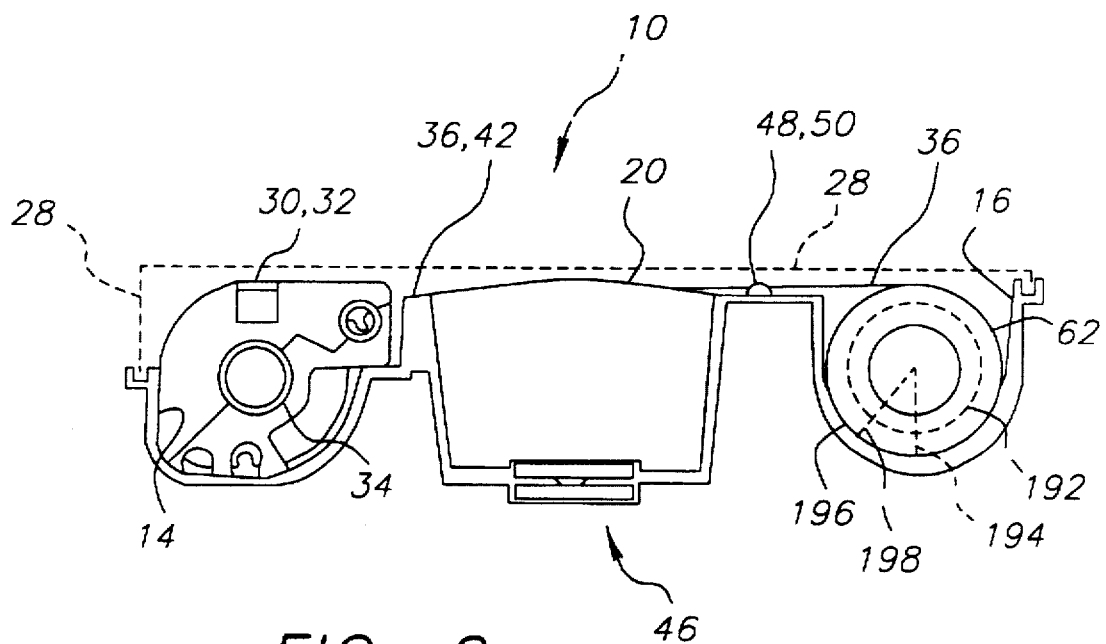
FIG. 2 is the same view of the camera frame assembly as shown in FIG. 1, after the winding of the film roll.
Figure 3:
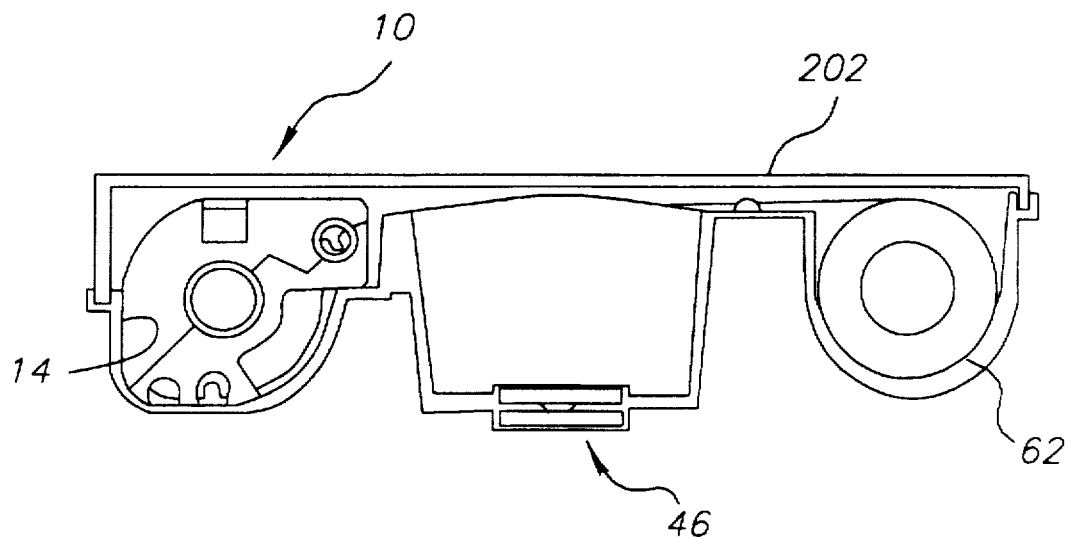
FIG. 3 is the same view of the camera frame assembly as shown in FIG. 2, after installation of the back cover closing the rear opening.

In the embodiment shown in FIGS. 16–20, the guide assemblage is utilized in the following manner. The leading portion 40 of the filmstrip 36 is advanced into the supply chamber 16 until the free end 40 is detected by a sensor (not illustrated in these figures) which can be mounted in the guide shoe 164. The stripper 186 is then moved by a linear actuator 106 toward the supply chamber until the shoulder 188 of the stripper 186 contacts the edge of the filmstrip 36. The stripper 186 is then stopped. The partial sleeve 166 is then moved along the stripper 186 and into the supply chamber 16. The medial edge 172 of the partial sleeve 166 is preferably chamfered from a forward end 190 toward the base of the sleeve. As the partial sleeve 166 is extended into the supply chamber 16, the free end 40 of the filmstrip 36 is lifted by a distance sufficient to avert the free end clear the mandrel 136, when the mandrel 136 is extended into the chamber. The mandrel 136 is then extended into the supply chamber 16. The rotation of the mandrel 136 is initiated and the vacuum source is switched on, when the mandrel 136 has entered the supply chamber 16 or before. The guide shoe 164 is then lowered relative to the supply chamber site 16a until the guide shoe 164 contacts the partial sleeve 166 and the predetermined nip 182 is defined between the idler roller 180 and the mandrel 136. As this occurs, the free end 40 of the filmstrip 36 is directed into the nip 182. (The free end 40 of the filmstrip is illustrated as being partially cut back to form an angled tip. This is a typical film feature, but is not a mandatory requirement for the method and apparatus.) The mandrel 136 continues to rotate. The idler roller 180 pinches the leading portion 38 of the filmstrip 36 against the mandrel 136 and the vacuum pulls the filmstrip 36 radially toward the mandrel axis 150. After about one and one-half revolutions, the leading portion 38 of the filmstrip 36 is cinched onto the mandrel 136. A vacuum sensor (not shown) positioned in the vacuum line detects the drop in air flow or decrease in air pressure resulting from the cinching. The vacuum sensor signals a control, which in response withdraws the guide shoe 164 and partial sleeve 166. The main portion 44 of the filmstrip is then pulled into the chamber 16 by the mandrel 136 and wound over the leading portion producing the film roll 62. Referring now to FIG. 2, the film roll 62 has an outermost turn 192 (indicated in FIG. 2 by a dashed line) that defines a first film roll radius 194 that is larger than the preliminary radius 142.

Winding of the film roll continues until the main portion 44 of the filmstrip 36 has reached the film roll 62. This is ordinarily the major portion of the filmstrip. The trailing portion 42 of the filmstrip necessarily remains attached to the spool 84 of the film cartridge 30 and extends to the film roll 62. The rotation of the mandrel 136 is stopped before an excessive strain is placed on the trailing portion 42. This may be done in a variety of ways. For example, a sensor can detect an increased load on the mandrel due to reaching the trailing portion; or a detector can count rotation of the film spool or another rotating part; or a detector can track the length or area of filmstrip traveling to the film roll; or film can be wound for a predetermined time. With any of these approaches a slip clutch can be provided in the mandrel to accommodate excessive strain.

After winding is completed, the mandrel 136 is removed from the film supply chamber. The vacuum is first turned off and compressed air of other gas may be blown back through the mandrel 136 to encourage release of the film roll. At this time, the mandrel 136 can be rotated backwards a revolution or so to further encourage the film roll to release. The combination of these effects allows the film roll to loosen and expand such that the outermost turn 196 defines a second film roll radius 198 larger than the first film roll radius 194. In a preferred embodiment, the film roll does not expand substantially beyond the throat 17 of the supply chamber 16. This can be accomplished in different ways. For example, the supply chamber can include a vacuum port (not shown) through which a vacuum can be applied to the film roll in the manner disclosed in U.S. Pat. No. 5,608,482, which is hereby incorporated herein by reference. The frame 12 can alternatively have wedges 200 at the medial margin of the throat 17, that narrow the throat to a width less than the width of the widest portion of the supply chamber 16 and thus limit clock-springing of the film roll.

The mandrel 136 is next removed from the supply chamber by retracting the mandrel into the stripper 186, while leaving the stripper 186 in place against the edge of the filmstrip 36. Because the radial gap between the mandrel 136 and stripper 186 is less than the thickness of the filmstrip 36, telescoping is at least substantially prevented.

In a currently non-preferred embodiment, the mandrel is detachable from the apparatus in the manner of a spool. Although the spool can be relatively simple this still adds an additional part to the camera and the complexity of a release mechanism for detaching the spool.

In an embodiment in which a film bridge 86 is used, the film bridge 86 is displaced relative to the camera frame assembly 10, prior to removal of the mandrel 136; so slack in the filmstrip 36 can be taken up by rolling a final portion of the filmstrip onto the film roll or retracting that part of the filmstrip back into the cartridge 30.

The rear opening 28 of the camera frame assembly 10 is next closed and the camera frame assembly is rendered light-tight. This can be a single step in which a light-tight back 202 is attached to the frame 12 or can involve multiple steps. For example, a back can be attached over the rear opening followed by the plugging of a bottom opening to render the assembly light-tight. The resulting camera assembly can be a completed camera or can be a camera subunit requiring additional assembly operations for completion. In addition to the features already discussed, including a film cartridge and film roll, the camera assembly can also include other conventional camera features well known to those of skill in the art.

The film roll 62 can telescope outward during mandrel 136 removal or after mandrel 136 removal if the camera frame assembly 10 is vibrated. A distended portion of the film roll 62 presents a grave risk of pinching or other damage when the camera is rendered light-tight. It is thus highly desirable, at least once before installing the back 202 or otherwise closing the camera, to lodge the film roll 62 fully within the supply chamber 16 axially (in a direction parallel to the film space axis 26). The stripper 186 can provide axial lodging during removal of the mandrel 136, as previously discussed. The stripper 186 can also be replaced or supplemented by one or more tampers 300. Each tamper 300 is included in the apparatus 52 in a separate station 68, as shown in FIG. 21, or as a part of the previously described station 68 at which the film roll 62 was formed, or a succeeding station 68. Like the stripper 186, the tamper or tampers 300 secure the film roll 62 within the supply chamber 16 during or after removal of the mandrel 136. Each tamper 300 includes a linear actuator 106, such as an air cylinder, which tamps a tamp head 302 against the end of the film roll 62 to drive any outwardly telescoped portion of the film roll back into the remainder of the film roll and axially lodge the entire film roll 62 in the supply chamber 16. The tamp head 302, in the tamper 300 shown in FIG. 21, is fixed to its linear actuator 106.

Referring to FIGS. 22–24, the axial lodging can also be accomplished by providing a prepositioned partial wall 304 or a post-loading wall 306 on the bottom of the chamber 16. The partial wall 304 is provided as a part of the camera frame assembly 10 and can replace the stripper 186. This is less desirable than the use of the stripper 186, because the partial wall 304 is subject to frame assembly tolerances and presents a greater risk of inaccurate positioning and incomplete axial lodging of the film roll 62 in the supply chamber 16. The post-loading wall 306 is installed on the camera frame assembly 10 after mandrel 136 removal. The post-loading wall 306 can be partial, but is preferably full; that is, the post-loading wall 306, after installation, preferably occludes the entire end opening of the supply chamber 16.

The post-loading wall 306 can be installed in a direction radial to the film space axis 26, as shown in FIG. 23, in which case, a stripper 186 or tamper 300 is needed to initially secure the film roll 62 in the supply chamber 16. The post-loading wall 306 can also be installed in a direction parallel to the film space axis 26, as shown in FIG. 24. In this case, the post-loading loading wall 306 and wall installation tool 308 together comprise a tamper 300 and the use of the stripper 186 is optional.

Referring now to FIGS. 31–32, in a particular embodiment, the apparatus 52 includes a spool repositioner 400. The spool repositioner 400 is used to prevent active light lock closing during transport between stations. The camera frame assembly 10, in this embodiment, includes an active light lock closer 402 that is actuated by a cam surface 404 of a thumbwheel 94. Active light lock closers of this general type are disclosed in U.S. Pat. Nos. 5,614,976 and 5,629,750. The thumbwheel 94 also engages and is keyed reciprocally to the spool 34 of the film cartridge 30. The terms "reciprocally keyed" and the like, used herein, refer to complementary structures on the cartridge spool 34 and the thumbwheel 94 that allow engagement of the thumbwheel 94 and spool 34 in only a single rotation orientation relative to each other. For example, the Advanced Photo System™ cartridge has a spool having a generally cylindrical socket with a notch or keyway extending axially part way along the socket. A matching thumbwheel has a generally cylindrical shaft with an axially extending key complementary to the keyway of the spool.

FIGS. 25–30 illustrate the active light lock closer 402 (ALL closer 402) and thumbwheel 94 of a particular camera frame assembly 10 usable with the invention. The ALL closer 402 has a drive unit 406 that is pivotably mounted to the frame 12. The drive unit 406 has an ALL coupling 408 on one end and a first sector 410 on the other. The ALL coupling 408 extends into the cartridge chamber 14 to engage the active light lock 412 of the cartridge 30. The ALL coupling 408 has a partial flange 414 that extends radially outward from the pivot axis 416 of the drive unit 406. The first sector 410 is meshed with teeth of a second sector 420 that is also pivotably mounted to the frame 12. The second sector 420 includes a follower 422 that is biased toward the C-shaped cam surface 404 of the thumbwheel 94 by a biasing spring (not shown). A sensor lever 426 is pivotably mounted to the frame 12 in the cartridge chamber 14 adjoining the intermediate section 20. The sensor lever 426 is biased rearward, that is, toward the filmstrip 36 in the completed camera; and has a rearwardly extending contact pad 428 that limits filmstrip contact to an area outside the exposure area. A tab 430 on the sensor lever 426 is positioned so as to contact the partial flange 414 and block rotation of the drive unit 406 when the presence of the filmstrip 36 is sensed. In this film sensed position, the follower 422 remains spaced apart from the cam surface 404 of the thumbwheel 94 and the active light lock 412 remains open. In the completed camera, when the filmstrip has been rewound into the cartridge, the sensor lever 426 moves rearward and the drive unit 406 rotates to a film absent-light lock open position, in which the follower 422 bears against the cam surface 404 of the thumbwheel 94. The active light lock 412 is partially closed by this movement of the drive unit 406, which comprises about 10 degrees of rotation. As the thumbwheel 94 is rotated further, the follower 422 travels along the cam surface 404 and enters the gap 432 of the C-shaped cam surface 404. This movement of the follower 422 pivots the sectors 410,420 to a film absent-light lock closed position and fully closes the active light lock 412.

Referring again to FIGS. 25–30, the sensor lever 426 does not reliably block rotation of the drive unit 406 until the filmstrip 36 has been prewound and the back 202 has been installed over the camera frame assembly 10. Prior to that time, the position of the active light lock 412 is determined by the position of the follower 422 on the cam surface 404 of the thumbwheel 94. If the follower 422 is disposed on the outer rim of the C-shaped cam surface 404, then the active light lock 412 is open. When the follower 422 enters the gap 432 in the cam surface 404, the active light lock 412 closes. Since the sensor lever 426 is not effective until the back 202 is in place, the active light lock 412 closes even if the filmstrip 36 is present in the active light lock 412. Filmstrip damage is a likely result.

Referring now to FIGS. 31–32, the spool repositioner 400 can be disposed in a separate station 68 or as a part of a previously described station located after the station providing thrusting of the leading portion 38 of the filmstrip 36 from the cartridge. The spool repositioner 400 has a quill 104 that is moved into engagement with the film cartridge spool 34, in the same manner as the quill 104 previously described. The spool repositioner 400 also has a holder 434 that has a grip head 436 that is moved toward and away from the intermediate section 20 of the camera frame assembly 10. The spool repositioner 400 is used after the leading portion 38 of the filmstrip 36 has been advanced over the intermediate section 20 by a film transport in the manner previously described. The holder 434 has a linear actuator 106 that advances the grip head 436 to an active position. In the active position, the grip head 436 engages the leading portion 38 by friction or by suction supplied by a vacuum line (not shown) and holds the leading portion 38 in a fixed position within and relative to the intermediate section 20 of the camera frame assembly 10. The spool repositioner 400 has a sensor 438 that is directed towards a spool position indicator 440 at the end of cartridge 30 or toward an indicator (not shown) provided as a part of the quill 104, such as a digital shaft encoder. (Spool position indicators are well known to those of skill in the art and are present on Advanced Photo Systems™ film cartridges.) The sensor 438 detects the rotational position of the spool 34 and thumbwheel 94 relative to the drive unit 406 and sends a signal along a signal path 442 to a controller 444.

The controller 444, in response to the signal from the sensor, actuates the drive of a quill 104 and rotates the spool 34 and thumbwheel 94 to provide a required net rotation of less than 360 degrees. The degree of rotation is that necessary to ensure that the cartridge spool 34 is parked within the safety zone 446, that is, that the follower 422 of the ALL closer 402 is positioned on the cam surface 404. It is currently preferred to park the spool 34 at the approximate middle of the C-shaped cam surface 404. It is preferred that rotation be in the rewind direction only, since rotation in the thrust direction presents a risk of film bunching or other distortion. The controller 444 of the quill drive can include a load sensor to detect when the filmstrip is taut and deactivate the quill.

After spool repositioning, the camera frame assembly can be transported, as desired, and the thrusting of the film can be continued until the free end 40 of the filmstrip 36 is impelled into the supply chamber. A detector 124 can be positioned to sense optically or in some other manner when the free end 40 reaches the supply chamber space 16a and signal the controller (not shown) to stop thrusting.

Referring now to FIGS. 33–37, in a particular embodiment, the apparatus 52 includes a thumbwheel aligner 500, which is used with a quill 104. The aligner 500 and quill 104 are associated with the cartridge mover 76 and are referred to collectively herein as a cartridge positioner-thruster 502. It is preferred that the cartridge mover 76, aligner 500, and the quill 104 are preferably all at the same station 68 of the apparatus 52, but the cartridge mover 76 can be provided at an upstream station 68 if desired. The cartridge mover 76, aligner 500, and quill 104 are located and move relative to the site 10a of the camera frame assembly 10 on the receiver 54 in the same manner previously described for other components 56. The cartridge mover 76 operates as previously described to place the film cartridge 30 in the cartridge chamber 14. The active light lock 412 can be opened prior to placement of the cartridge 30, as previously described.

The aligner 500 includes a pair of subcomponents: a jack 504 and a one-way mechanism 506. The jack 504 has an axis 508 that is coextensive with the cartridge chamber axis 15 when the aligner 500 is in its active position. The jack 504 is adapted to engage the thumbwheel 94 and hold the thumbwheel 94 in alignment with the jack axis 508 and permit rotation of the thumbwheel 94 about the jack axis 508. In the aligner 500 shown in the figures, the jack 504 has a freely rotatable cylindrical post 510 that is received by a closely-sized cylindrical post-hole 512 in the thumbwheel 94.

The one-way mechanism 506 permits the thumbwheel 94 to rotate about the jack axis 508 in a thrust direction, indicated in FIG. 34 by arrow 514, but deters rotation of the thumbwheel 94 about the jack axis 508 in a rewind direction, indicated by arrow 516. Detailed characteristics of the one-way mechanism 506 are not critical. A variety of one-way mechanisms are well known having a wide variety of features, for example, the one-way mechanism can be a ratchet and pawl mechanism that is unitary with the jack. It is currently preferred, however, that the one-way mechanism 506 be a ratcheting pawl, as shown in FIG. 34. The ratcheting pawl 506 is discrete from the jack 504 and the thumbwheel 94 has a toothed margin 518 that is adapted to act as a ratchet wheel for the ratcheting pawl 506. In this embodiment, the ratcheting pawl 506 and jack 504 are each joined to a rigid support 520, in fixed relation to each other. The ratcheting pawl 506 has a lever arm 522 that is pivotably mounted to the support 520 and is disposed to engage the thumbwheel 94. The ratcheting pawl 506 is biased toward the thumbwheel 94. A stop 524 limits rotation of the lever arm 522 when the thumbwheel 94 is not present. Biasing is provided by a spring 526 that engages the lever arm 522 and the stop 526. The teeth 528 of the thumbwheel 94 and an engagement portion 530 of the lever arm 522 are shaped so as to permit rotation in the thrust direction, but deter rotation in the rewind direction. This embodiment of the one-way mechanism has the advantages of simplicity and that wear can be largely limited to the thumbwheel, which can be replaced as necessary during camera recycling.

With the aligner 500 shown in FIGS. 33-37, the thumbwheel 94 is preinstalled on the camera frame assembly 10 by another component (not shown) of the apparatus. The thumbwheel 94 can, alternatively, be installed on the camera frame assembly 10 by the aligner 500. In this case, FIG. 33 would illustrate the conclusion of this step, in which the thumbwheel 94 has been seated in the frame 12. The cartridge 30 could be positioned in the cartridge chamber 14, before or after installation of the thumbwheel 94.

After the cartridge 30 has been positioned in the cartridge chamber 14 of the camera frame assembly 10, the quill 104 is moved and is rotated in the same manner previously described. The quill 104 is placed in close axial proximity to the spool 34 of the film cartridge 30 and is turned in the rewind direction. During the turning, the quill 104 is driven against the spool 34 urging the quill drivekey 110 axially toward the cartridge 30 and urging the cartridge 30 toward the thumbwheel drivekey 100 until the drivekeys 100,110 mate engagingly with respective engagement portions 102, 112 of the cartridge spool 34. The thumbwheel 94 does not rotate, because rotation of the thumbwheel 94 in the rewind direction is prevented by the one-way mechanism 506.

While the quill 106 is rotated in the rewind direction and the drivekeys 100,110 are urged into engagement with the spool 34, the jack 504 continuously retains the thumbwheel drivekey 100 in axial alignment with the quill 104. This retention of alignment decreases the average time needed to engage the drivekeys 100,110 and spool 34 and reduces the risk of the thumbwheel drivekey 100 and spool 34 jack-knifing and protruding out of alignment with the cartridge chamber axis 15.

After engagement of the thumbwheel 94 and spool 34, and spool 34 and quill 104; the direction of rotation of the quill 104 is reversed and the spool 34 and thumbwheel 94 are rotated in the rewind direction. This rotation in the thrust direction is continued until the leading portion 38 of the filmstrip 36 is thrust from the cartridge 30. The leading portion 38 is then transported to the supply chamber 16 in the manner previously described. If desired, this transporting can occur at the same station 68 as cartridge positioner-thruster 502 and a film bridge 86 can be utilized as previously described. After reaching the supply chamber 16, the filmstrip 36 is wound in a film roll 62 in the manner above-described.

The invention has been described in detail with particular reference to certain preferred embodiments thereof, but it will be understood that variations and modifications can be effected within the spirit and scope of the invention.

PARTS LIST camera frame assembly 10
camera frame 12
cartridge chamber 14
cartridge chamber axis 15
supply chamber 16
throat or opening 15,17
side openings 18
intermediate section or exposure frame 20
concave interior wall 22
film space 24
film space axis 26
rear opening or rear accessway 28
film cartridge 30
canister 32
spool 34
filmstrip 36
leading portion 38
free end 40
tail portion or trailing portion 42
main portion 44
exposure system 46
camera film drive 48
film engagement member 50
apparatus 52
receiver 54
active components 56
loading position 58
film roll 62
pallet or nest 64 positioner 66
stations 68
actuation mechanism 70
non-use position 72
use or active position 74
cartridge mover 76
vacuum gripper 78
active light lock opener 80
spool rotator 82
spool 84
film bridge 86
friction reducing features 87
film path 88
vacuum-compressed gas unit 89
belt 90
belt drive 91
idler rollers 92
thumbwheel 94
endwall 96
rotation member 98
thumbwheel drivekey 100
axial cut-out or engagement portion 102
cartridge nest 103
quill 104
linear actuator 106
arrow 108
slot 109
quill drivekey 110
detent or key member 111
second cut-out or engagement portion 112
body 113
clamping member 114
arrow 115
thumbwheel and cartridge axes 116,118
detector 120
arrow 122
detector 124
film retention fingers 126
film entrance 128
film guiding member 130
bottom 132
pockets 134
mandrel or spool 136
film guides 138
preliminary film space 140
preliminary radius 142
curling axis 144
interior wall 146
air passages 148
mandrel axis 150
cinch dog 152
shank 154
distal side 155
hook 156
arrow 158
alternative curling axis 160
entry 162
upper guide or guide shoe 164
lower guide or partial sleeve 166
inner surface 168
distal edge 170
medial edge 172
arm 174
inner surface 176
lower edge 178
bearing member or idler roller 180
nip 182 support portion 184
stripper 186
shoulder 188
forward end 190
outermost turn 192
first film roll radius 194
outermost turn after release 196
second film roll radius 198
wedges 200
back 202
tampers 300
tamp head 302
partial wall 304
post-loading wall 306
wall installation tool 308
spool repositioner 400
active light lock closer 402
cam surface 404
drive unit 406
ALL coupling 408
first sector 410
active light lock 412
partial flange 414
pivot axis 416
second sector 420
follower 422
biasing spring (not shown)
sensor lever 426
contact pad 428
tab 430
gap 432
holder 434
grip head 436
sensor 438
spool position indicator 440
path 442
controller 444
thumbwheel aligner 500
cartridge positioner-thruster 502
jack 504
one-way mechanism 506
jack axis 508
post 510
post-hole 512
arrow 514
arrow 516
toothed margin 518
rigid support 520
lever arm 522
stop 524
spring 526
teeth 528
engagement portion 530

What is claimed is:

1. A method for assembling a photographic camera having a cartridge chamber and a supply chamber, said method comprising the steps of:

positioning a film cartridge in said cartridge chamber, said film cartridge including a spool and a filmstrip;

curling a leading portion of said filmstrip about a curling axis internal to said supply chamber;

during said curling, limiting deflection of said leading portion in directions radial to said axis beyond a predetermined preliminary radius;

winding a main portion of said filmstrip around said leading portion to form a film roll, said film roll having an outermost turn defining a first film roll radius larger than said preliminary radius;

following said winding, allowing said film roll to expand to a second film roll radius larger than said first film roll radius; and limiting outward telescoping of said film roll.

2. The method of claim 1 wherein said limiting outward telescoping further comprises axially lodging said film roll within said supply chamber.

3. The method of claim 1 wherein said camera has a rear opening over said chambers and said method further comprises closing said rear opening following said allowing and axially lodging steps.

4. The method of claim 1 wherein said limiting outward telescoping further comprises tamping a tamp head against said film roll.

5. The method of claim 1 further comprising the steps of:

advancing a leading portion of said filmstrip out of said cartridge to said supply chamber;

transporting a main portion of said filmstrip to said supply chamber; and wherein said limiting outward telescoping further comprises axially lodging said film roll within said supply chamber.

6. The method of claim 5 wherein said camera has a rear opening over said chambers and said method further comprises closing said rear opening following said allowing and axially lodging steps.

7. A method for loading and prewinding a photographic film cartridge in a camera frame assembly having a rear opening, said method comprising the steps of:

positioning a film cartridge in a cartridge chamber of the camera frame assembly;

advancing a leading portion of a filmstrip out of the cartridge to a supply chamber of the camera frame assembly;

admitting a mandrel into said supply chamber;

guiding said leading portion of said filmstrip around said mandrel;

cinching said filmstrip to said mandrel;

rotating said mandrel to wind a main portion of said filmstrip into a film roll around said mandrel;

removing said mandrel from said film roll;

axially lodging said film roll in said supply chamber.

8. The method of claim 7 further comprising, following said axially lodging, closing said rear opening of the camera frame assembly.

9. The method of claim 7 wherein said axial lodging further comprises tamping a tamp head against said film roll.

10. The method of claim 7 wherein said supply chamber has an interior wall; and said method further comprises, prior to said guiding step, interposing at least one guide between said mandrel and said interior wall of said supply chamber; and, after said cinching step, withdrawing each said guide from said supply chamber.

11. A camera assembling apparatus, for use with a camera frame assembly having a cartridge chamber and a supply chamber, and a film cartridge disposed in the cartridge chamber, said film cartridge having a case and a filmstrip; said apparatus comprising:

means for transporting a leading portion of the filmstrip from the film cartridge to the supply chamber;

mandrel having an axis of rotation;

a guide coaxial with said mandrel;

said mandrel and said guide each being independently displaceable in and out of said supply chamber along said axis of rotation, said guide being disposable in a use position within said supply chamber wherein said guide curls said leading portion about said mandrel; said mandrel being rotatable about said axis to wind said filmstrip into a film roll; and means for axially lodging said film roll within said supply chamber.

12. The apparatus of claim 11 further comprising means for limiting clock-springing of said film roll.

13. The apparatus of claim 11 wherein said apparatus has a plurality of stations and further comprises a receiver transporting said camera frame assembly between said stations.

14. The apparatus of claim 13 wherein said means for axially lodging further comprises a tamper movable toward said supply chamber in a direction parallel to said axis of rotation.

15. The apparatus of claim 14 further comprising a plurality of said tampers.

16. The apparatus of claim 11 wherein said means for axially lodging further comprises a tamper movable toward said supply chamber in a direction parallel to said axis of rotation.

17. The apparatus of claim 16 further comprising a plurality of said tampers.

18. The apparatus of claim 16 wherein said tamper further comprises a tamp head fixed to a linear actuator.

19. The apparatus of claim 16 wherein said means for transporting further comprises a film bridge.

20. The apparatus of claim 16 further comprising a film stripper disposable adjoining said supply chamber, said film stripper being coaxial with said mandrel.

* * * * *